United States Patent
Bullen et al.

(10) Patent No.: US 7,197,662 B2
(45) Date of Patent: Mar. 27, 2007

(54) METHODS AND SYSTEMS FOR A STORAGE SYSTEM

(75) Inventors: Melvin James Bullen, Reston, VA (US); Steven Louis Dodd, Reston, VA (US); William Thomas Lynch, Apex, NC (US); David James Herbison, Arvada, CO (US)

(73) Assignee: Ring Technology Enterprises, LLC, Reston, VA (US)

( * ) Notice: Subject to any disclaimer, the term of this patent is extended or adjusted under 35 U.S.C. 154(b) by 866 days.

(21) Appl. No.: 10/284,199

(22) Filed: Oct. 31, 2002

(65) Prior Publication Data

US 2004/0088393 A1   May 6, 2004

(51) Int. Cl.
*G06F 11/00* (2006.01)
(52) U.S. Cl. .................... 714/6; 714/7; 714/42
(58) Field of Classification Search .............. 714/6, 714/7, 42
See application file for complete search history.

(56) References Cited

U.S. PATENT DOCUMENTS

| | | |
|---|---|---|
| 3,713,096 A | 1/1973 | Comfort et al. |
| 3,735,362 A | 5/1973 | Ashany et al. |
| 3,748,647 A | 7/1973 | Ashany et al. |
| 3,812,476 A | 5/1974 | Cragon |
| 4,064,556 A | 12/1977 | Edelberg et al. |
| 4,065,756 A | 12/1977 | Panigrahi |
| 4,193,121 A | 3/1980 | Fedida et al. |
| 4,302,632 A | 11/1981 | Vicari et al. |
| 4,334,305 A | 6/1982 | Girardi |
| 4,363,125 A | 12/1982 | Brewer et al. |
| 4,506,387 A | 3/1985 | Walter |
| 4,510,599 A | 4/1985 | Ulug |
| 4,538,174 A | 8/1985 | Gargini et al. |
| 4,646,270 A | 2/1987 | Voss |
| 4,672,602 A | 6/1987 | Hargrave et al. |
| 4,709,418 A | 11/1987 | Fox et al. |
| 4,763,317 A | 8/1988 | Lehman et al. |
| 4,790,418 A | 12/1988 | Brown et al. |
| 4,796,231 A | 1/1989 | Pinkham |
| 4,980,857 A | 12/1990 | Walter et al. |
| 4,995,078 A | 2/1991 | Monslow et al. |
| 5,003,591 A | 3/1991 | Kauffman et al. |

(Continued)

FOREIGN PATENT DOCUMENTS

WO   WO 2004/025476 A1   3/2004

OTHER PUBLICATIONS

Farley, Marc, "Building Storage Networks, Second Edition", Osbourne/McGraw-Hill, 2001, entire book.

(Continued)

*Primary Examiner*—Michael Maskulinski
(74) *Attorney, Agent, or Firm*—Finnegan, Henderson, Farabow, Garrett & Dunner, L.L.P.

(57) ABSTRACT

A storage system that may include one or more memory sections, one or more switches, and a management system. The memory sections include memory devices and a section controller capable of detecting faults with the memory section and transmitting messages to the management system regarding detected faults. The storage system may include a management system capable of receiving fault messages from the section controllers and removing from, service the faulty memory sections. Additionally, the management system may determine routing algorithms for the one or more switches.

21 Claims, 15 Drawing Sheets

U.S. PATENT DOCUMENTS

| | | | |
|---|---|---|---|
| 5,014,125 | A | 5/1991 | Pocock et al. |
| 5,027,400 | A | 6/1991 | Baji et al. |
| 5,060,068 | A | 10/1991 | Lindstrom |
| 5,062,059 | A | 10/1991 | Youngblood et al. |
| 5,084,839 | A | 1/1992 | Young |
| 5,119,481 | A | 6/1992 | Frank et al. |
| 5,130,792 | A | 7/1992 | Tindell et al. |
| 5,132,992 | A | 7/1992 | Yurt et al. |
| 5,133,079 | A | 7/1992 | Ballantyne et al. |
| 5,153,884 | A | 10/1992 | Lucak et al. |
| 5,163,024 | A | 11/1992 | Heilveil et al. |
| 5,191,410 | A | 3/1993 | McCalley et al. |
| 5,200,925 | A | 4/1993 | Morouka et al. |
| 5,247,347 | A | 9/1993 | Litteral et al. |
| 5,253,341 | A | 10/1993 | Rozmanith et al. |
| 5,261,114 | A | 11/1993 | Raasch et al. |
| 5,369,784 | A | 11/1994 | Nelson et al. |
| 5,371,532 | A | 12/1994 | Gelman et al. |
| 5,374,952 | A | 12/1994 | Flohr |
| 5,400,331 | A | 3/1995 | Lucak et al. |
| 5,553,311 | A | 9/1996 | McLaughlin et al. |
| 5,581,479 | A | 12/1996 | McLaughlin et al. |
| 5,604,682 | A | 2/1997 | McLaughlin et al. |
| 5,636,139 | A | 6/1997 | McLaughlin et al. |
| 5,883,831 | A | 3/1999 | Lopez et al. |
| 5,908,333 | A | 6/1999 | Perino et al. |
| 5,909,564 | A | 6/1999 | Alexander et al. |
| 5,953,263 | A | 9/1999 | Farmwald et al. |
| 5,954,804 | A | 9/1999 | Farmwald et al. |
| 5,968,114 | A | 10/1999 | Wentka et al. |
| 5,978,295 | A | 11/1999 | Pomet et al. |
| 6,032,214 | A | 2/2000 | Farmwald et al. |
| 6,034,918 | A | 3/2000 | Farmwald et al. |
| 6,185,644 | B1 | 2/2001 | Farmwald et al. |
| 6,317,377 | B1 | 11/2001 | Kobayashi |
| 6,356,973 | B1 | 3/2002 | McLaughlin et al. |
| 6,356,975 | B1 | 3/2002 | Barth et al. |
| 6,498,741 | B2 | 12/2002 | Matsudera et al. |
| 6,587,909 | B1 * | 7/2003 | Olarig et al. ............... 710/302 |
| 6,684,292 | B2 * | 1/2004 | Piccirillo et al. ........... 711/106 |
| 6,697,368 | B2 | 2/2004 | Chang et al. |
| 6,728,799 | B1 | 4/2004 | Perner et al. |
| 6,879,526 | B2 | 4/2005 | Lynch et al. |
| 6,981,173 | B2 * | 12/2005 | Ferguson et al. ............... 714/5 |
| 2003/0018930 | A1 | 1/2003 | Mora et al. |
| 2003/0187945 | A1 | 10/2003 | Lubbers et al. |
| 2004/0044744 | A1 | 3/2004 | Grosner et al. |
| 2004/0168101 | A1 * | 8/2004 | Kubo ............................. 714/6 |

OTHER PUBLICATIONS

Clark, Tom, "Designing Storage Area Networks—A Practical Reference for Implementing Fibre Channel SANs", Addison-Wesley, 1999.
U.S. Appl. No. 10/284,198 including Specification, Claims and Figures.
U.S. Appl. No. 10/284,278 including Specification, Claims and Figures.
U.S. Appl. No. 10/284,268 including Specification, Claims and Figures.
Malavalli, Kumar, "Fibre Channel Classes of Service for Data Transport," Brocade Communications Services, Inc. 1997, 15 pages.
"HyperTransport™ I/O Link Specification," HyperTransport Technology Consortium, Rev. 1.03, Oct. 10, 2001, 217 pages.
Tran, Jennifer, "Synthesizable 1.6 Gbytes/s DDR SRAM Controller" Xilinx Application Note XAPP200, Mar. 21, 2000, 12 pages.
"Using Block SelectRAM+ Memory in Spartan-II FPGAs," Xilinx Application Note XAPP173, Dec. 11, 2000, 15 pages.
"200-MHz SDRAM Controller Core Product Specification" Alliance Core, Jan. 10, 2000, 4 pages.
Bapat, Sheker, "Synthesizable 200 MHz ZBT SRAM Interface" Xilinx Application Note XAPP136, Jan. 10, 2000, 6 pages.
"Synthesizable High Performance SDRAM Controller" Xilinx Application Note XAPP134, Feb. 1, 2001, 16 pages.
Ma, Alex, "Synchronous DRAM Controller" Powerpoint slides, EE527 Spring 1998, 21 pages.
PCT Search Report dated Jan. 14, 2005 for International Application No. PCT/US03/33665.
Office Action for U.S. Appl. No. 10/284,278, dated Mar. 18, 2005, (12 pages).
Office Action for U.S. Appl. No. 10/284,278 dated Sep. 26, 2005, (13 pages).
Office Action for U.S. Appl. No. 10/284,268 dated Mar. 18, 2005, (14 pages).
Office Action for U.S. Appl. No. 10/284,268 dated Sep. 21, 2005, (13 pages).
Office Action for U.S. Appl. No. 11/030,881 dated Jan. 11, 2006, (5 pages).
Office Action for U.S. Appl. No. 11/030,881 dated Jul. 27, 2005, (8 pages).
PCT Search Report dated Jan. 14, 2005, for International Application No. PCT/US03/33665.
Office Action for U.S. Appl. No. 11/030,881 dated Jul. 10, 2006, (5 pages).
Office Action for U.S. Appl. No. 10/284,278 dated Apr. 24, 2006, (12 pages).
Office Action for U.S. Appl. No. 10/284,268 dated Apr. 24, 2006, (16 pages).
Preston, W. Curtis, "Using SANs and NAS," O'Reilly & Associates, Inc., Feb. 2002.
Mauro, Douglas R., et al., "Essential SNMP," O'Reilly & Associates, Inc., Jul. 2001.
Prince, Betty, "High Performance Memories New architecture DRAMs and SRAMs—evolution and function Revised Edition," John Wiley & Sons, Ltd., 1996, entire book.
RDRAM® Memory: Leading Performance and Value Over SDRAM and DDR, Document WP0001-R, Version 1.2, 2001.
RDRAM® : Maximizing the Value of PCs and Workstations, Document WP0003-R, Version 1.0, 2001.
The Economist, Jun. 22$^{nd}$, 2002, 28$^{th}$ edition, A Match for Flash?, pp. 22-23.
Office Action for U.S. Appl. No. 10/284,278 dated Mar. 18, 2005, (12 pages).
Office Action for U.S. Appl. No. 10/284,278 dated Sep. 26, 2005, (13 pages).
Office Action for U.S. Appl. No. 10/284,268 dated Mar. 18, 2005, (14 pages).
Office Action for U.S. Appl. No. 10/284,268 dated Sep. 21, 2005, (13 pages).
Office Action for U.S. Appl. No. 11/030,881 dated Jan. 11, 2006, (5 pages).
Office Action for U.S. Appl. No. 11/030,881 dated Jul. 27, 2005, (8 pages).
PCT Search Report dated Jan. 14, 2005, for International Application No. PCT/US03/33665.
"170 MHz FIFOs Using the Virtex Block SelectRAM+ Features" Xilinx Application Note XAPP131, Jun. 5, 2001, 6 pages.
"Using the Virtex Block SelectRAM+ Features" Xilinx Application Note XAPP130, Dec. 18, 2000, 11 pages.
"API Networks, enabling technology for next generation product . . . HyperTransport technology licensed by HP" (retrieved Mar. 18, 2002) <http://www.api-networks.com/pressreleases/pr121001.shtml>, API Networks, Dec. 10, 2001, 2 pages.
Richmond, Robert, "AMD 64-Bit K8 Platform Preview" (retrieved Mar. 11, 2002) Sep. 14, 2000, 4 pages.
"InfiniBridge MT21108 Infiniband Channel Adapter and Eight Port Switch" Product Specification, Mellanox Technologies, (date unknown) 4 pages.
"Block SelectRAM Overview" (retrieved Mar. 18, 2002) <http://www.xilinx.com/xil_prodcat_systemsolution.jsp?title=xam_memory_embedded_ blockram_pag>, 2 pages.
McComas, Bert "PCI-X or InfiniBand Complementary New Technologies Go Head to Head" (retrieved Mar. 18, 2002) <http:www.

inqst.com/articles/pcixvib/pciarticle.htm>, Inquest Market Research, Jan. 19, 2001, 10 pages.

"API Networks Accelerates Use of HyperTransport™ Technology With Launch of Industry's First HyperTransport-to-PCI Bridge Chip " API Networks Press Release, Apr. 2, 2001, 2 pages.

"HyperTransport-to-PCI Bridge Chip from API Networks" Cahners Business Information 2002, 1 page.

"API Networks Unveils Industry's First HyperTransport™ Switch to Bring Products to Market Quickly and Cost-Effectively" API Network Press Release, Nov. 5, 2001, 4 pages.

"74F1763 Intelligent DRAM Controller Product Information" Philips Semiconductors 2002, 2 pages.

"Sections 5.4.1 - 5.4.5 of document describing DRAM and DRAM Controller" (author and date unknown).

"Basic DRAM Cell" (retrieved Mar. 17, 2002) <http://www.mit.edu:8001/people/tairan/6371/node59.html>, MIT, Jun. 26, 1996, 1 page.

"Row Address Decoder and Row Driver" (retrieved Mar. 17, 2002) <http://www.mit.edu:8001/people/tairan/6371/node60.html>, MIT, Jun. 26, 1996, 1 page.

"Column Decode and Refresh Control Logic" (retrieved Mar. 17, 2002) <http://www.mit.edu:8001/people/tairan/6371/node61.html>, MIT, Jun. 26, 1996, 1 page.

"Refresh Circuit" (retrieved Mar.17, 2002) <http://www.mit.edu:8001/people/tairan/6371/node62.html>, MIT, Jun. 26, 1996, 1 page.

"Refresh Address Control" (retrieved Mar. 17, 2002) <http://www.mit.edu:8001/people/tairan/6371/node63.html>, MIT, Jun. 26, 1996, 1 page.

"Data-In Tristate Buffer" (retrieved Mar. 17, 2002) <http://www.mit.edu:8001/people/tairan/6371/node64.html>, MIT, Jun. 26, 1996, 1 page.

"Data-out Precharging Circuits and Control Circuits" (retrieved Mar. 17, 2002) <http://www.mit.edu:8001/people/tairan/6371/node65.html>, MIT, Jun. 26, 1996, 1 page.

"Output Multiplexer" (retrieved Mar. 17, 2002), <http://www.mit.edu:8001/people/tairan/6371/node66.html>, MIT, Jun. 26, 1996, 1 page.

"Other Circuits" (retrieved Mar. 17, 2002) <http://www.mit.edu:8001/people/tairan/6371/node67.html>, MIT, Jun. 26, 1996, 1 page.

"Simulations" (retrieved Mar. 17, 2002) <http://www.mit.edu:8001/people/tairan/6371/node68.html>, MIT, Jun. 26, 1996 1 page.

"Comments" (retrieved Mar. 17, 2002) <http://www.mit.edu:8001/people/tairan/6371/node70.html>, MIT, Jun. 26, 1995, 1 page.

"HHSPICE Verification of Latch" (retrieved Mar. 17, 2002), <http://www.mit.edu:8001/people/tairan/6371/node73.html>, MIT, Jun. 26, 1996, 1 page.

"Introduction" (retrieved Mar. 17, 2002) http://www4.tomshardware.com/mainboard/98q4/981024/index.html, 2 pages.

"Basic DRAM Operation" (retrieved Mar. 17, 2002) <http://www4.tomshardware.com/mainboard/98q4/981024/ram-01.html>, 2 pages.

"Asynchronous Operation" (retrieved Mar. 17, 2002), <http://www4.tomshardware.com/mainboard/98q4/981024/ram-02.html>, 2 pages.

"Synchronous Operation" (retrieved Mar. 17, 2002) <http://www4.tomshardware.com/mainboard/98q4/981024/ram-07.html>, 2 pages.

"DDR SDRAM" (retrieved Mar. 17, 2002), <http://www4.tomshardware.com/mainboard/98q4/981024/ram-10.html>, 2 pages.

\* cited by examiner

METHODS AND SYSTEMS FOR A STORAGE SYSTEM

RELATED APPLICATIONS

The present application relates to the U.S. patent application Ser. No. 10/284,278 by M. James Bullen, Steven L. Dodd, David J. Herbison, and William T. Lynch, entitled "Methods and Systems for a Storage System Including and Improved Switch," and the U.S. patent application Ser. No. 10/284,268 by M. James Bullen, Steven L. Dodd, David J. Herbison, and William T. Lynch, entitled "Methods and Systems for a Memory Section," both of which are incorporated by reference herein in their entireties.

BACKGROUND

The present invention relates to data storage, and more particularly, to methods and systems for a high throughput storage device.

A form of on-line transaction processing (OLTP) applications requiring a high number of data block reads or writes are called H-OLTP applications. A large server or mainframe or several servers typically host an H-OLTP application. Typically, these applications involve the use of a real time operating system, a relational database, optical fiber based networking, distributed communications facilities to a user community, and the application itself. Storage solutions for these applications use a combination of mechanical disk drives and cached memory under stored program control. The techniques for the storage management of H-OLTP applications can use redundant file storage algorithms on multiple disk drives, memory cache replications, data coherency algorithms, and/or load balancing.

A brief overview of the storage management technologies of cached disk arrays (CDAs) and solid-state disk storage systems (SSDs) follows.

Cached disk arrays (CDAs) combine disk drives and solid-state memory systems under common program control. The disk drives in CDAs are servo-mechanical devices. Advances in motor technology currently allow the platters of the disk drives to spin at 15,000 revolutions per minute; advanced systems may spin their platters at 18,000 revolutions per minute.

CDAs combine several racks of rotating disks with a common memory cache in an architecture where capacity may be added through the addition of more racks of devices, more cache, or both. CDAs often are used by companies to provide storage services in their mission critical applications, including H-OLTP applications.

The on-board cache of a CDA stores frequently used data because access times for data in cache memory can be short relative to access times for data on the drives. Such high-end storage system devices with rotating media, such as CDAs, include less than ideally desirable characteristics in terms of total throughput and memory cache size.

A solid-state disk (SSD) is a storage device corresponding to the solid-state memory attached to a computer's central processing unit through its internal bus structure. To an external computer (server or mainframe) the SSD appears as a very fast disk drive when it is directly attached to the computer over a fast communications link or network. Operating under stored program control, SSDs store frequently used information like transaction logs, database indices, and specialized data structures integral to the efficient execution of a company's mission critical applications.

It would be desirable for large capacity storage to provide sufficient throughput for high-volume, real-time applications, especially, for example in emerging applications in financial, defense, research, customer management, and homeland security areas.

SUMMARY

Accordingly, the present invention is directed to methods and systems that address the problems of prior art.

In accordance with the purposes of the invention, as embodied and broadly described herein, methods and systems for an apparatus are provided including one or more memory sections, one or more switches, and a management system. The one or memory sections include one or more memory devices capable of storing data in storage locations, and a memory section controller capable of detecting faults in the memory section and transmitting a fault message in response to the detected faults. The one or more switches include one or more interfaces for connecting to one or more external devices, and a switch fabric connected to one or more memory sections and the external device interfaces and interconnecting the memory sections and the external device interfaces based on an algorithm. A management system is provided capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm.

The summary and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

Figure 1:
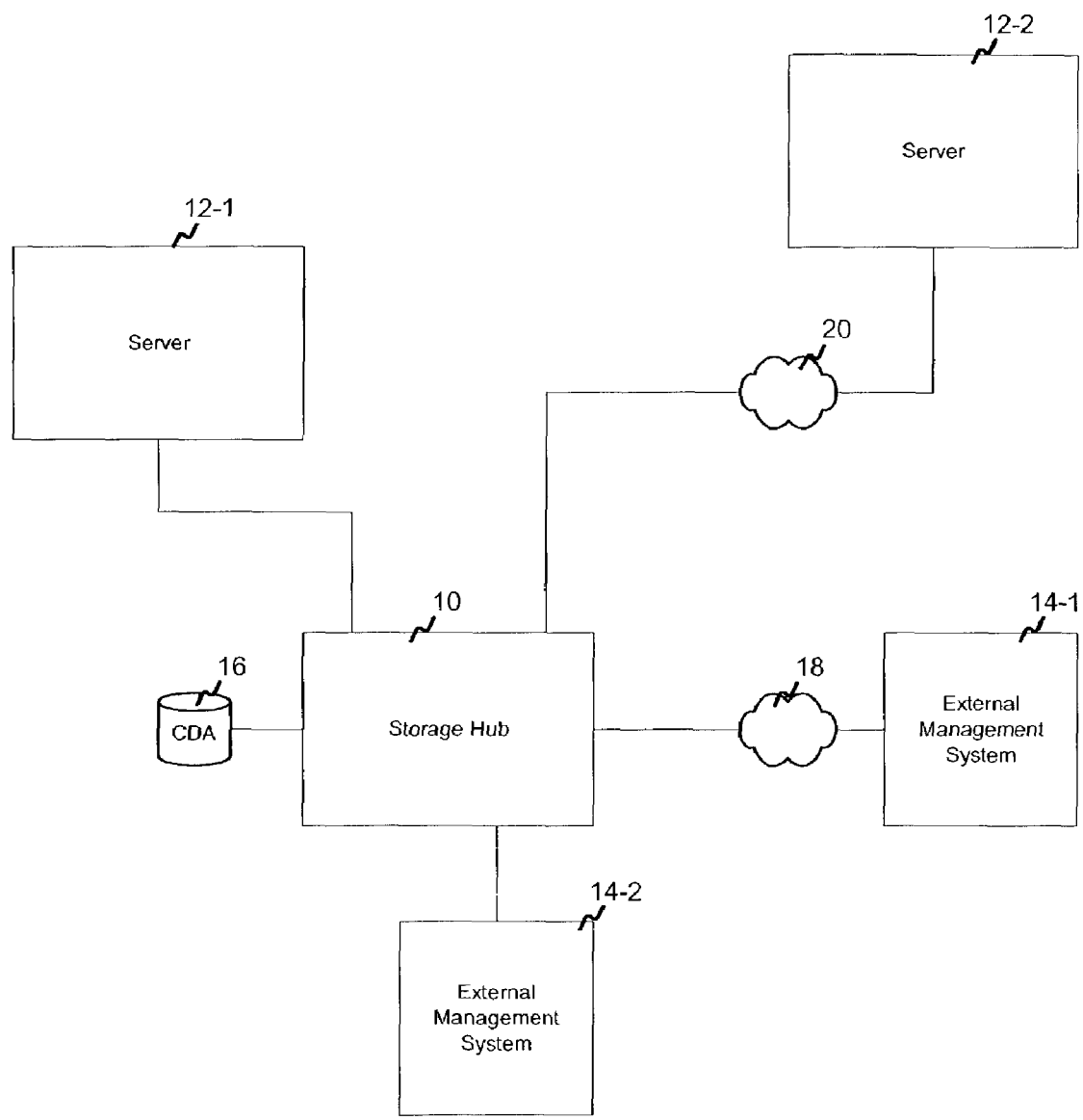
FIG. 1 is a block diagram of a storage hub environment, in accordance with methods and systems provided.

FIG. 1 is a block diagram of one embodiment storage hub environment, in accordance with methods and systems provided. As illustrated, the storage hub environment includes a storage hub 10, servers 12-1 and 12-2, external management systems 14-1 and 14-2, a non-volatile storage device 16, an IP network 18 and a connection to another network 20. The storage hub 10 may include a large amount of storage (not shown) and stores the data in data blocks. Although the data may be stored in data blocks, any other mechanism for storing the data may be used without departing from the scope of the invention. The non-volatile storage device 16 may be a magnetic storage device, such as a CDA as described above. The non-volatile storage device 16 may be used to store back-up versions of the data stored by the storage hub 10.

The description below is organized in the following manner. First, a brief overview of the storage hub 10 environment illustrated in FIG. 1 is presented. Then, more detailed descriptions of the components of the storage hub 10 are presented, after which a more detailed description of exemplary methods for writing data to the storage hub, reading data from the storage hub 10, and a testing operation for the storage hub 10 are presented. Then, exemplary alternatives to these components are presented. It should, however, be understood that these are all exemplary descriptions regarding example methods and systems for implementing the invention. As such, one of skill will recognize that there are other methods and systems that may be used for practicing the invention that is defined by the claims of this application.

The servers 12-1 and 12-2 are, for example, standard commercially available servers or farms of servers that can be connected to internal or external networks (not shown). For example, the servers 12-1 and/or 12-2 may be connected to an internal network such as an Ethernet for receiving requests for the retrieval or storage of information from end users connected to the network. Alternatively, the servers 12-1 and/or 12-2 could be connected to external networks, such as the Internet, for receiving requests for retrieval or storage of information from end users connected to the external network. Further, although two servers 12-1 and 12-2 are illustrated, the storage hub 10 may be connected to any number of servers 12.

When an application being executed by the server 12 requires data, the server 12 determines if the storage hub 10 stores the data. The servers 12 may store a record showing whether the data their applications require is on the storage hub 10. The server 12 then sends a data request to the storage hub 10 requesting the data. The storage hub 10 reads the data from the location in which it is stored and sends it to the server requesting the data 12-1 or 12-2. The server may run different types of applications and database management systems that may require data from the storage hub 10. Examples of typical applications include, by way of example only, billing systems, customer relationship management systems, reservations systems, ordering systems, security systems, etc. Examples of database management systems include ORACLE, DB2, Sybase, Informix, etc.

Additionally, the storage hub 10 may receive a request from a server 12-1 or 12-2 to store data. Thereafter, the storage hub 10 preferably provides the server 12 with either an acknowledgement that the write occurred (i.e., the storage of the data) or a failure message. Such messages could include, for example, an acknowledgement that the data block was safely stored on both the storage (not shown) in the storage hub 10 and on the CDA 16 when a CDA 16 is used as backup for the storage hub 10, an acknowledgement that the data block is safely stored in the storage hub's 10 storage (not shown), no acknowledgement of any sort, or a failure message.

The external management system 14 may be directly connected to the storage hub 10, such as external management system 14-2. Or, the external management system 14 may be connected to the storage hub 10 via a network, such as external management systems 14-1 that is connected to the storage hub 10 via network 18. Network 18 may be any type of network, such as an internal Ethernet network, an IP network, or the Internet. Although FIG. 1 illustrates both external management systems 14-1 and 14-2 connected to the storage hub 10, in other implementations there may be only one or any number of external management systems, or an external management system 14 need not be included. For example, in other implementations it may be desirable to have 3 or more external management systems. Additionally, the external management system may be a computer running proprietary or commercially available software, such as, for example, HP Openview. The storage hub 10 may provide surveillance and administration information to the external management system 14, such as the status and location of stored data blocks.

Figure 2:
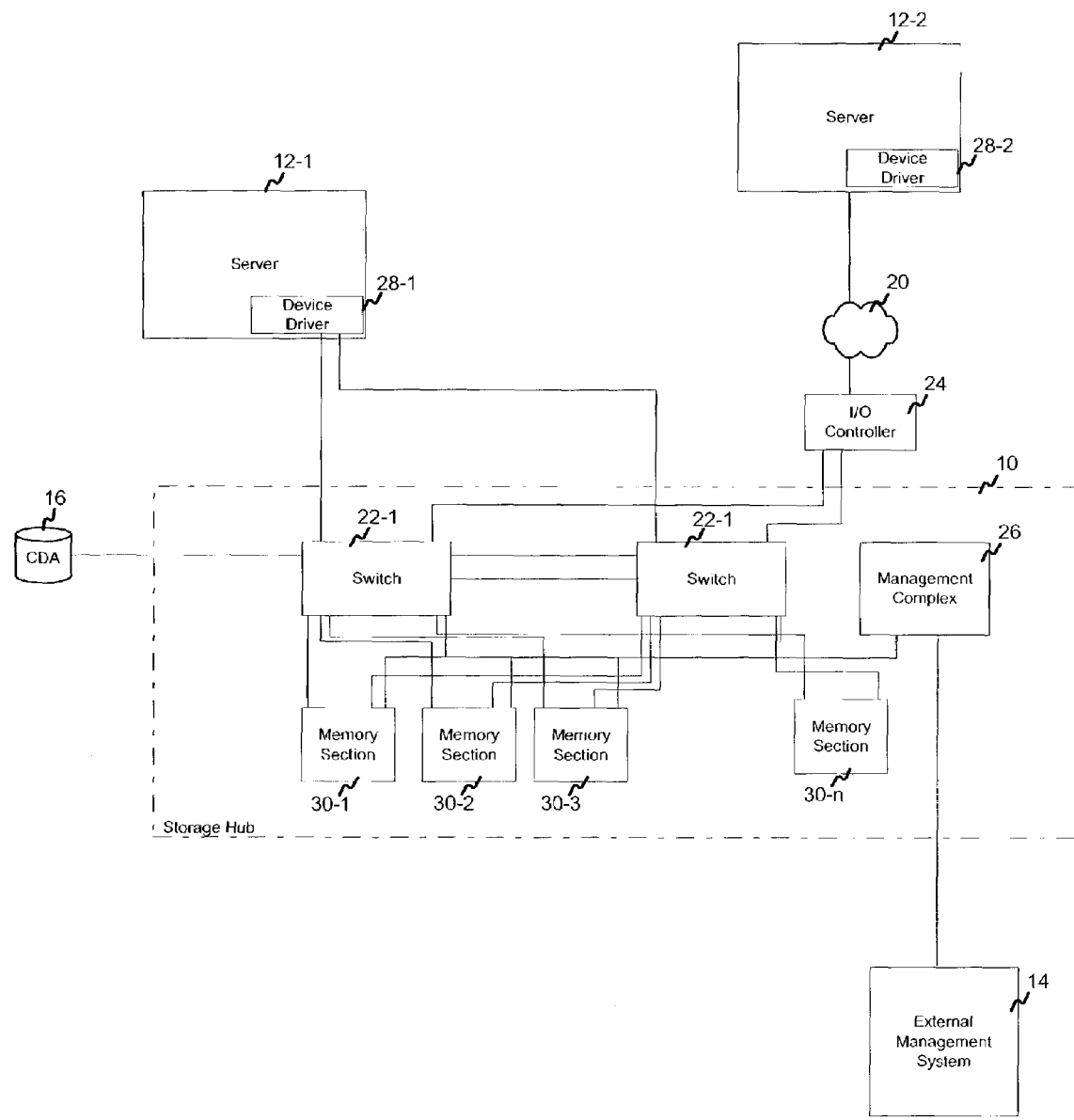
FIG. 2 is a more detailed block diagram of a storage hub, in accordance with methods and systems provided.

FIG. 2 illustrates a more detailed block diagram of the storage hub 10, in accordance with methods and systems provided. As illustrated, the storage hub 10 includes a switch or switches 22-1 and 22-2, a management complex 26, and memory sections 30-1 thru 30-n. In this embodiment, both switches 22-1 and 22-2 may be active or one of the switches may be active while the other is a redundant switch for use in the event the active switch suffers a problem. Although FIG. 2 illustrates two switches, the storage hub 12 may include only one switch or any number of switches.

In FIG. 2, server 12-2 connects to the storage hub 10 via a network 20 thru an input/output (I/O) controller 24. The network may be any type of internal or external network, such as an Ethernet network or the Internet. The I/O controller 24 preferably is an appropriate I/O controller for connecting to the particular network 20. Preferably, the I/O controller 24 converts signals between a native protocol of the network 20 and a local protocol used by the storage hub 10. Potential protocols include, but are not limited to, Telecommunications Control Protocol/Internet Protocol (TCP/IP), System Network Architecture (SNA)-based protocols, Serial Communications Control Interface (SCCI), Intelligent Serial Communications Interface (ISCI), Fibre Channel, Infiniband, and other third generation input/output (3GIO) protocols The memory sections 30 preferably include the storage for the storage hub 10 along with other hardware for accessing the storage. As used herein, the term "memory section" refers to any subsystem including one or more memory devices that may be used for storing information. This architecture is applicable to any device that can store data. Thus, when the storage hub 10 receives a request to store data, the data is forwarded to a memory section 30, which stores the data. Likewise, when a request for data is received by the storage hub 10, the request is directed to the memory section 30 storing the requested information. The memory section 30 then reads the requested data, after which it is sent to the server 12 requesting the data. More detailed descriptions of exemplary memory sections 30 and their operations are presented below.

The management complex 26 of the storage hub 10 performs management-type functions for the storage hub 10 and connects the storage hub 10 with the external management system 14. As used herein the term "management complex" refers to any software and/or hardware for performing management of the storage hub 10. A more detailed description of the management complex 26 is presented below.

The I/O Controller 24 and switches 22-1 and 22-2 are preferably under common management control by the management complex 26 to allow data blocks to be sent to and received from the storage hub in the native protocol of the network 20.

Each server 12-1 and 12-2 preferably includes a device driver 28-1 and 28-2, respectively. The device driver 28 is a program running in software on a server that permits applications on the server to cause data to be read from or written to (i.e., stored in) the storage hub 10. When a server 12 receives a request to read or write data, the device driver 28 of the server 12 forwards the request to the switch in the storage hub 10. The device driver 28 may be, for example, a standard device driver supplied as part of server-resident software, or it may be, for example, proprietary software supplied by a vendor of storage devices. Additionally, in some applications, the device driver 28 may be independent of any application resident on the server.

The switches 22-1 and 22-2 are connected to the server 12-1, the I/O controller 24, the CDA 16, the memory sections 30-1 thru 30-n, and each other via an industry standard communications interface protocol. These communications interface protocols may be, for example, Fibre Channel, Asynchronous Transfer Mode (ATM), Ethernet, Fiber Distributed Data Interface (FDDI) a Systems Network Architecture (SNA) interface, or X.25. Any type of physical connection, e.g., copper or fiber optic cables, may be used for connecting these various components. The management complex 26 is preferably connected to the switches 22, memory sections 30-1 thru 30-n, the I/O controller 26, and the external management system 14 via gigabit Ethernet connections. Although these are preferable connections, persons skilled in the art will recognize there are numerous other protocols and physical media that may be used to connect these devices. Further, the memory sections 30 may simultaneously support multiple protocols and physical media for connecting these devices.

The switches 22 may be any type of switch using any type of switch fabric, such as, for example, a time division multiplexed fabric or a space division multiplexed fabric. As used herein, the term "switch fabric" the physical interconnection architecture that directs data from an incoming interface to an outgoing interface. For example, the switches 22 may be a Fibre Channel switch, an ATM switch, a switched fast Ethernet switch, a switched FDDI switch, or any other type of switch. The switches 22 may also include a controller (not shown) for controlling the switch.

For write operations, the data block, in addition to being written to the memory sections 30 of the storage hub 10, may also be written to the cached disk array 16 or another storage hub (not shown). After the data is written, the storage hub 10 may send an acknowledgement to the device driver 28 of the server 12 depending upon the configuration management parameters in the management complex 26. Examples of configuration management parameters are status parameters, write-acknowledgement parameters, routing parameters, reporting interval parameters, and the current date and time.

For a read data block request and at the request of the device driver 28 requesting the data block, the switches 22 direct the request to the appropriate memory section 30, which retrieves the data block and transmits it through a switch 22 to the device driver 28 of the server 12 from which the request originated.

During read and write data block operations and depending on the configuration management parameters in the management complex 26, the memory section 30 gathers administrative data that it sends to the management complex 26. The management complex 26 then makes this data available to the external management system 14.

Additionally, the management complex 26 may gather and provide the external management system 14 with surveillance and administrative information. Surveillance information may include, for example, memory section heartbeats (i.e., a signal that shows that the memory section can still communicate), alarms, and acknowledgement of alarms. Administration information may include, for example, statistics about data read and written, statistics about the number of active memory sections, statistics about memory section availability, and reports that present the preceding information to the external management system.

The external management system 14 may also provide the management complex 26 with configuration management data. This configuration management information may include, for example, valid communications network addresses, a period for heartbeat intervals, data block sizes, and command sets.

The storage hub 10 may also perform bit-level error recovery using standard means available in the industry. For example, error correction codes (ECC), also referred to as error detection and correction (EDAC) codes, using circuitry and/or software may be used to test data for its accuracy. These codes and techniques include parity bit or cyclic redundancy checks, using multiple parity bits in order to detect and correct errors, or more advanced techniques (e.g., Reed-Solomon codes) to detect multiple errors. Further, each memory section 30 of the storage hub 10 may include its own error correction scheme.

The following provides a more detailed description of the components of the storage hub 10 illustrated in FIG. 2: the management complex 26, the switches 22, and the memory sections 30. After which, more detailed descriptions of exemplary reading, writing, and testing operations are presented. Then, alternative exemplary embodiments of the memory sections 30 are provided along with exemplary characteristics of the storage hub 10 and its components.

Management Complex

Figure 3:
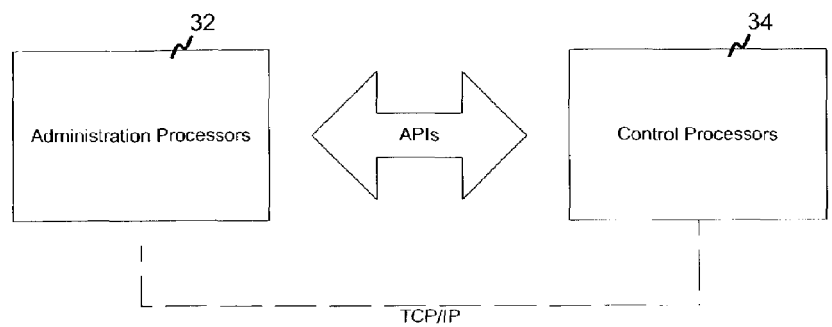
FIG. 3 illustrates a logical architecture for a management complex, in accordance with methods and systems provided.

FIG. 3 illustrates a logical architecture for a management complex 26, in accordance with methods and systems provided. As illustrated, the management complex 26 may include functions that manage administrative processes 32 and functions that manage control processes 34. These management functions can include one or more central processing units (CPUs) for executing their respective processes. Additionally, the management complex 26 may use one or more application program interfaces (APIs) for communications between these functions.

Figure 4:
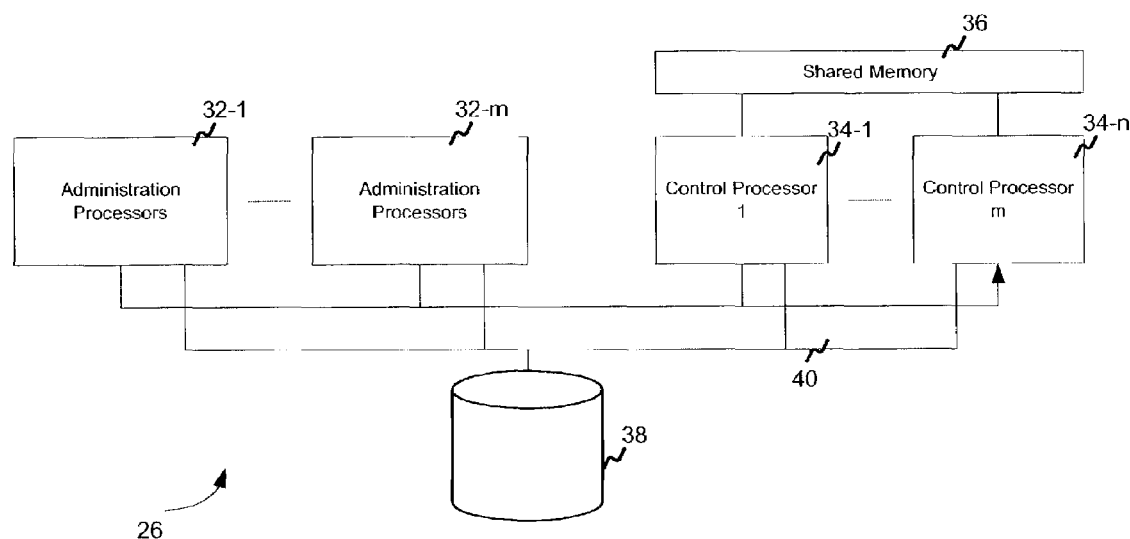
FIG. 4 is a block diagram of a physical architecture for a management complex, in accordance with methods and systems provided.

FIG. 4 is a block diagram of a physical architecture for a management complex 26, in accordance with methods and systems provided. As illustrated, the management complex includes one or more control processors 34-1 thru 34-n, a shared memory 36, one or more administration processors 32-1 thru 32-m, a storage device 38, and a communications network 40. As discussed above, the control processors 34 may include one or more central processing units (CPUs). These control CPUs 34-1 thru 34-n interface with the shared memory 36. The communications network 40 may be an internal network and may use any type of communications protocol, such as Gigabit Ethernet.

One or more of the control processor (e.g., 34-1 thru 34-m) may function as the master(s), while remaining control processors (e.g., 34-(m+1) thru 34-n) may be kept in a hot standby mode, so that they can be quickly switched to in the event one of the master control processor (e.g., 34-1) fail.

The control CPU's 34 may be attached to a communications network, such as a Gigabit Ethernet network, and be directly attached to the magnetic storage device 38.

The administrative processors 32 each may include a memory (not shown) and also be attached to the communications network 40. These administration processors may also connect to the magnetic storage device 38. The magnetic storage device 38 stores various control and administrative information from the control processors 34 and administration processors 32. The magnetic storage device 38 may be any type of magnetic storage device, such as, for example, servo-mechanical disc drives. In other embodiments, the storage device 38 need not be included.

The control processors 34 perform configuration management functions for the memory sections 30, I/O controllers 24, switches 22, and the device drivers 28 of the servers 12. As used herein, the term "configuration" is a broad term that encompasses the various possible operating states of each component of the storage hub. As used herein, an "operating state" refers to a possible way in which the storage hub or one of its components operates as defined by parameter values. These parameter values, for example, may be set by a user of the storage hub, such as, for example, a system administrator, through, for example, an external management system 14. Operating states may include, for example, how often a component (e.g., a memory section 30) sends performance statistics to the management complex 26, the list of events that causes a component (e.g., a memory section, etc.) to report an alarm, and/or the type of alarm reported (e.g., catastrophic failure of component, minor fault with component, etc.). Further, as used herein, the term "configuration management" means the understanding of the current operating states of the storage hub's components and the capability to react to changes in the states of those components as defined by software running in the control processors 34. For example, the control processors 34 may control in real time the number of active memory sections 30 in the storage hub 10, the switches 22, and the device drivers 28 of the servers 12, if any, and any external servers 22 connected to the storage hub.

The software in the control processors 34 may also be capable of bringing new memory sections into service and taking memory sections out of service independently of other functions that the management complex performs and without materially affecting the operation of other memory sections 30 or adversely affecting the overall performance of the storage hub. The instructions to perform this function are carried from the control process 34 to the switches 22 and may be carried to the device drivers 28 in the servers 12. In the case that new capacity is added to the storage hub 10, then it is possible to bring new memory sections 30 into service with the software capability in the control processors 32. In the case that a memory section 30 has failed, then the faulty memory section 30 may be replaced and a new one brought into service. A further description of fault management follows.

The control processors 34 may also, for example, be able to perform fault management for the storage hub 10. The term "fault management" as used herein means attempting to detect faults and take corrective action in response to the detection of a fault. For example, the control processors may recognize an operational failure of a memory section 30 or part of a memory section 30 and re-map data to working memory sections 30. Then, the control processors 34 may communicate this re-mapping to the external management system 14 and the device drivers 28 running on servers 12 attached to the storage hub 10.

The control processors 34 may also manage "bad-block" remapping functions when a memory section fails 30 and the writing of data to the magnetic storage device 38 in the event of power failures. Bad block remapping is a process wherein data blocks discovered by the section controller 54 or management complex 26 to be in a damaged memory device are, if possible, recovered.

For example, if the control processors 34 discover that block 65,000 in memory section 30-2 does not read correctly, the control processor 34 may decide to remap block 65,000 in memory section 30-2 to block location 1,999,998 in memory section 30-2. The control processor 34 may then direct the CDA 16 to read the data block and cause it to be written in location 1,999,998 in memory section 30-2. Once completed, the control processor 34 may inform the switches 22 and memory section 30-2 that block 65,000 may now be read from location 1,999,998.

As another example of bad block remapping, if for example only one memory device on a memory section is faulty, a control processor 34 in the management complex 26 may inform the section controller 54 about the bad device, determine where the data on the faulty memory device is backed-up (e.g., CDA 16), and direct the backed-up data to be loaded into a replacement memory device on the same memory section or on a different memory section. In the latter case, the management complex also informs the switch about the data being relocated to a new memory section.

As yet another example, in the event the control processors 34 determine that a memory section 30 is faulty, the control processors 34 may direct that the entire memory section 30 is taken out of service and that a replacement memory section takes its place. To accomplish this, the control processors 34 may, for example, direct the CDA 16 to transfer a back-up version of the data for the faulty memory section 30 to another memory section 30-N that may be, for example, a spare memory section 30 for use in the event a memory section 30 goes bad. The new memory section 30-N then may operate as though it were the now faulty memory section 30. The control processors 34 may then communicate this information to the various device drivers 28 and the external management system 14.

The control processors 34 may also provide the memory sections 30, the switch controller(s) 202, and the I/O Controllers 24 with updated and new software. For example, if software used by the memory sections 30 or the switches 22 become corrupted and/or fails, the control processors 34 can load backup copies of current or previous versions of a software image from its storage 38. A software image is a binary object code that may be run directly by a computer. The software image for the control processor 34 in one embodiment is stored on the magnetic storage 38. Further, the control processors 34 may also control the loading of a data block from the CDA 16 into the memory sections 30 and visa versa.

In addition, the control processors 34 may receive information such as, for example, the time a component sent an alarm or the total elapsed time a component was in alarm from the components of the storage hub 10 over a communications interface.

The control processors 34 also may allow the administration processors 32 to gather data on parameters like the number of active memory sections 30, the total throughput of the storage hub 10 over time, the size of memory section queues, etc., that comprise the operating state of the storage hub. (Note that memory section queues are those queues in the section controller that comprise the list of yet-to-be completed read operations and write operations). In addition, the control processors 34 are responsible for monitoring their own operational status, such as, for example determining which control processor is active as Master, which are on standby, and which, if any, are not operational. Additionally, the control processors 34 may monitor the Storage Hub's environment for extreme temperatures or humidity, etc.

The control processors 34 may also store a copy of the software (i.e., a software image) run by the switches 22. A more thorough description of the switches 22 is present below. If the need arises, it can reload the switch software to one or more of the switches. As discussed below, the switch 22 may include one or more switch controllers (not shown) for executing this software to control the switch 22. In the event the switch 22 uses multiple controllers configured in a master-slave architecture, the control processor 34 may determine which of the controllers in the switch is(are) the master(s) and which is(are) the slave(s).

Additionally, the control processors 34 may determine the status (active, idle, out-of-service) of ports (not shown) on the switch 22, whether the ports are used to connect to servers 12 or to memory sections 30. The control processors 34 may also provide configuration management data to the switches 22. Examples of configuration management data include the date, the time, a routing algorithm to use, an interval for a status check, the identity of active server ports, etc. Further, the control processors 34 may instruct the switch to use different "hunt" algorithms to find idle ports that may be used in establishing connections. These algorithms may be included in the software executed by the switch controller, examples of which include rotary hunt, skip route, and least-used.

The administration processors 32 preferably collect information and statistics from the I/O controllers 24, memory sections 30, switches 22, and the control processors 34. The information and statistics collected may include information for generating statistical reports, telemetry data, and other alarms and administrative data. The administration processors 32 provide this information to the external management system 14 using a protocol, such as, for example, TCP/IP or any other suitable protocol. The administration processors 32 may collect data on such parameters from the device drivers 28, the switches 22, and the memory sections 30.

Users of the external management system, such as for example, a system administrator, may request a change in the configuration management parameters of the storage system 10. This change may, for example represent the addition of new memory sections 30. Users of the external management system 14, such as for example, a system administrator, may also request the administration processors 36 to collect statistical data from a storage area network environment (a set of storage devices connected by a network dedicated solely to the storage devices) including one or more storage hubs 10, a network area storage environment (a set of storage devices connected by a network shared with other traffic) including one or more storage hubs 10, and other external systems. For example, this statistical data may include the total incoming requests from each storage environment or from a particular server.

The administration processors 32 may execute a database program such that the administration data is stored in a standard database, which can then be used to provide the information to system administrators of the storage hub 10 in reports and graphs on a computer screen or on paper. For example, the system administrators of the storage hub may use an external management system 14 to gain access to this information. Alternatively, the system administrators of the storage hub 10 may access this information directly through an interface to the administration processors. Like the control processors 34, the administration processors 36 can monitor themselves and communicate their own operational state to the control processor 34, which determines which administration processors 34 are active or inactive for any reason.

The management complex 26 may instruct a non-volatile storage device to load data into one or more of the memory sections 30. For example, as illustrated in FIG. 2, the storage hub 10 may be connected to a non-volatile storage device such as a CDA 16. The management complex 26 may then be able to send instructions to the CDA 16, switches 22, and memory sections 30 to perform various activities. These activities may include the loading of the memory sections 30 from the non-volatile storage device 16 when the storage hub 10 is powered, when the storage hub 10 has been restarted after, for example, having lost power in an outage, as a result of administrative changes to the configuration of the storage hub 10, as a result of the failure of a memory section 30, or as a result of a user-initiated command.

Although the above presents numerous management and control functions capable of being performed by the management complex 26, it should be understood that the management complex 26 may perform all, a subset, or even entirely different functions. Additionally, although FIGS. 3 and 4 illustrate an exemplary management complex being implemented using separate administration processors 32 and control processors 34, a management complex may be implemented using only one, none, or any number of processors.

Memory Section

Figure 5:
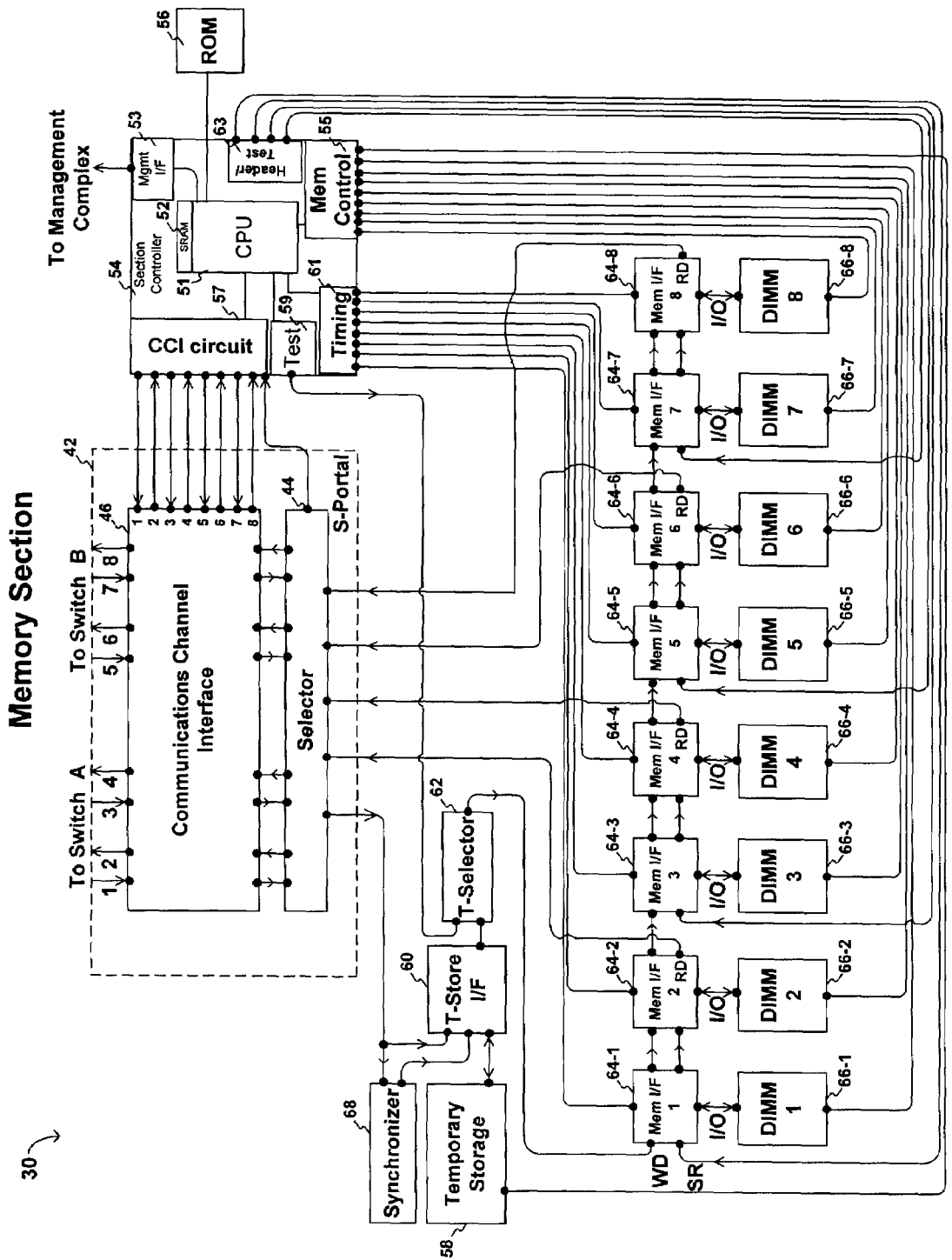
FIG. 5 is a block diagram of a exemplary memory section, in accordance with methods and systems provided.

FIG. 5 is a block diagram of an exemplary memory section 30, in accordance with methods and systems provided. As illustrated, the memory section 30 may include a switch portal ("S-portal") 42, a section controller 54, a read only memory (ROM) 56, a temporary storage 58, a temporary storage interface device 60, a temporary store selector ("T-selector") 62, a synchronizer 68, one or more memory interface devices 64-1 thru 64-8, and one or more memory devices 66-1 to 66-n.

The memory devices 66 may be any type of memory devices, such as, for example, dynamic random access memory (DRAMs), synchronous dynamic random access memory (SDRAMs), Rambus DRAMs (RDRAMs), magnetic random access memory, resistance random access memory, ferroelectric random access memory, polymer random access memory, chalcogenide random access memory, single in-line memory module (SIMMs), dual in-line memory module (DIMMs), rambus in-line memory modules (RIMMs), rotating media, etc. Although, the term memory interface device is used herein, it should be understood that this term should be interpreted broadly to include any type of access device capable of accessing information stored in a memory device. A more detailed description of exemplary memory interface devices is presented below.

The section controller 54 may, for example, include a microprocessor 51, internal memory 52, a management complex interface(s) 53, memory device control circuitry 55, communications channel interface (CCI) control circuitry 57, test circuitry 59, timing circuitry 61, and a Header/test interface 63. The microprocessor 51 may be, for example, a chip such as the Motorola G2 executing appropriate software. The internal memory 52 may be, for example, 32 megabytes of useable SRAM for program and data storage. This internal memory 52 may be included in the microprocessor 51, such as for example in a Motorola G2. The management complex interface 53 may, for example, be a TCP/IP running over gigabit Ethernet interface that the section controller 54 may use in communicating with the management complex 26. The header/test interface 63 may be an appropriate interface for providing information from the section controller 54 to the memory interface devices 64.

The section controller 54 further may access bootstrap read only memory 56 that may be used by it when power is first applied. This bootstrap read only memory 56 may, for example, contain a small software image that allows the section controller 54 to communicate with the control processors 34 to obtain the current software image via the management interface 53. The section controller 54 may further include CCI control circuitry 57 that may, for example contain a direct memory address circuitry for use in the management of the communications channel interface 46.

The section controller 54 may also include memory device control circuitry 55 for controlling the memory devices 66. This memory device control circuitry 55 may, for example include a memory latching circuit for controlling the state of the memory devices 66 through the binary states of the memory latch. A further description of memory latching is presented below. The section controller 54 may further include test circuitry 59 for testing the memory section 30. A more detailed description of an exemplary test procedure is presented below. Additionally, the section controller may include a header/test interface 63 for providing header type information (e.g., a data block identifier, destination address, etc.) and testing the memory section 30. Also, the section controller 54 may include timing circuitry 61 that may provide master and slave clock signal and other timing signals, such as start and stop read or write signals, etc. for use by the memory section.

The S-portal 42 may include a selector 44 and a communications channel interface 46. The communications channel interface 46 provides the interface for connecting the memory section 30 with the one or more servers 12 via the switches 22. This connection may be, for example, via one or more fiber optic or copper cables. The selector 44 may include circuitry for connecting the communications channel interface 46 with the one or more memory interface devices 64, such that the selector 44 may connect any memory interface device 64 with any I/O port of the communications channel interface 46. The section controller 54 via the CCI circuitry 57 may provide control signals to the selector 44 regarding how the selector should connect the memory interface devices 64 and communication channel interface 46. Additionally, the selector 44 may be directed to send data, such as, for example, test data, from a memory interface device 64 to the section controller 54 via the CCI circuitry 57.

The communications channel interface 46 can use any type of protocol, such as, for example, any standard channel interface protocol and the selector 44 may or may not be included. Exemplary standard channel interface protocols include Fibre Channel, System Network Architecture-based protocols, Intelligent Serial communications Control Interface, and other third generation input/output (3GIO) protocols.

The temporary storage interface device 60 is any type of device capable of accessing the temporary storage device 58. For example, the temporary storage interface device 60 may include one or more shift register arrays (not shown), including a plurality of shift registers interconnected in series, such that the data may be serially clocked through the shift register arrays. For a further description of shift register arrays and their use in accessing storage media such as memory devices, see the patent application by William T. Lynch and David J. Herbison, entitled "Methods and Systems for Improved Memory Access," filed on the same day as this application, which is incorporated by reference herein in its entirety.

The temporary storage 58 may be any type of memory device, such as a DRAM, SDRAM, SIMM, DIMM, a disk drive etc. The T-selector 62 may be any type of selector for selecting between a plurality of inputs.

The storage hub 10 may use a synchronizer 68 in embodiments where the temporary storage interface device 60 includes shift register arrays. In such an embodiment, the synchronizer 68 may, for example, accept data to be stored in the memory section 30 and use phase lock loop circuitry to extract a clock frequency from the incoming data stream. A temporary storage interface device 60 including shift register arrays may then use this clock signal to shift the data in writing data to the temporary storage device 58. This clock signal may be used, for example, to compensate for possible differences in either the phase or frequency of the incoming data from the memory section's system clock. When data is shifted out of the temporary storage interface device 60 for storage in the memory devices 66, the system clock for the memory section is preferably used to shift the data.

The section controller 54 may be capable of detecting faults in the memory section 30. For example, the section controller 54 may detect errors in the hardware or protocol used by the communications channel interface 42 through the communications channel interface circuit 57. Additionally, the section controller 54 may, for example, detect errors in the memory interface device 64 through the use of the Header/Test interface 63. Further, if the memory devices 66 include circuitry for detecting and/or correcting faults, such as, for example, electronic error correction circuitry (e.g, DIMMs), the memory devices 66 may communicate detected faults to the section controller 54 through the memory control 55. In the event the section controller 54 detects a fault, the section controller 54 may transmit information regarding the fault (e.g., time, component, type of fault) through the management interface 53 to the management complex 26.

The section controller 54 may also include an interface available for an external system (not shown) that permits the external system to obtain information about the section controller 54 through interaction with the microprocessor 51. This interface may, for example support a keyboard and display for direct diagnostic observations. The external system interface (not shown) may also, for example support an interface to a personal computer or similar system for direct diagnostic observations. The external system, not shown, may also use this interface, for example, to install special software on the microprocessor 51 in support of testing or related diagnostic functions.

The above description provides one example of an exemplary memory section. Other methods and systems may be used for implementing a memory section without departing from the scope of the invention. For example, the discussion below presents a different exemplary embodiment of a memory section using PCI bus technology.

Switches

Figure 6:
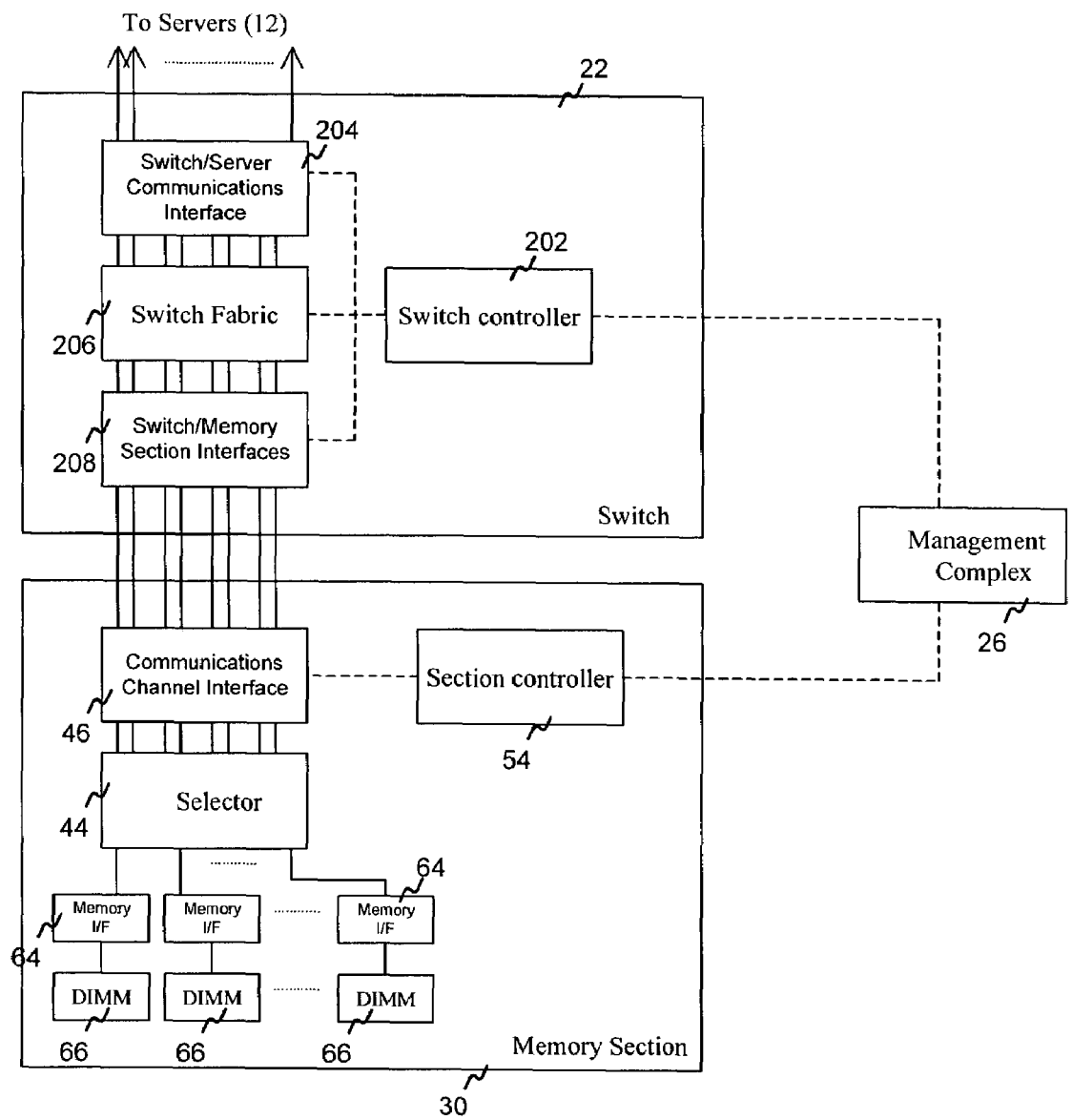
FIG. 6 illustrates a functional diagram of a switch and memory section, in accordance with methods and system consistent with the invention.

FIG. 6 illustrates a functional diagram of a switch 22, in accordance with methods and system consistent with the invention. As illustrated, the switch 22 includes a switch/server communications interface 204 for interfacing with a server 12, a switch/memory section communications interface 208, a switch fabric 206, and a switch controller 202. The switch/server communications interface 204 and switch/memory section communications interface 208 may be standard switch interfaces found in commercially available switches and the terms memory section and server are used to indicate the devices to which the connections leaving the switch 22 preferably connect. The switch fabric 22 may be any type of switch fabric, such as an IP switch fabric, an FDDI switch fabric, an ATM switch fabric, an Ethernet switch fabric, an OC-x type switch fabric, or a Fibre channel switch fabric. Thus, the switch 22 may be any type of commercially available switch.

In this embodiment, the management complex 26 of the storage hub 10 may exercise control over the switch 22 through the switch controller 202, and may exercise control over the communications channel interface 46 of the memory section 30 through the section controller. For example, as discussed above, the management complex 26 may provide the switch controller 202 with an algorithm for switching traffic through the switch fabric 206. Further, as discussed above, the management complex 26 may provide other information including, for example, providing the switch with new copies of the software it executes, a regular period to send a heartbeat (i.e., a signal that verifies the switch still can communicate), a list of valid communications network addresses, alarm acknowledgements, and command sets. Further, as discussed above, the management complex 26 may provide other information including, for example, instructions to copy a communications message, modify its contents, and then process the new message. The management complex 26 may provide other information including, for example, instructions to broadcast information to multiple addresses.

Figure 7:
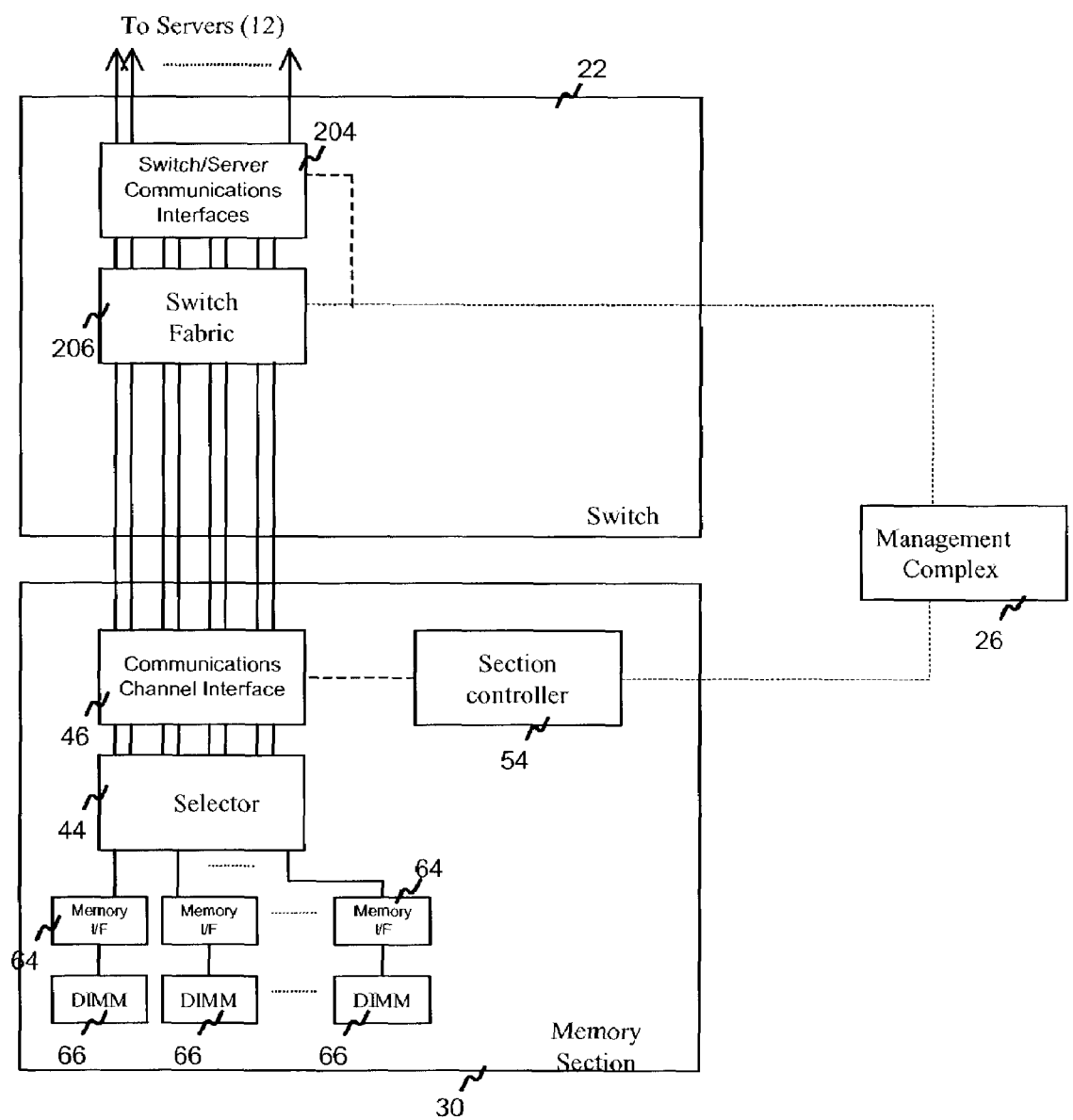
FIG. 7 illustrates an alternative functional diagram of a switch and memory section, in accordance with methods and systems provided.

FIG. 7 illustrates an alternative functional diagram of the management of the switch 22 and the communications channel interface 46 of the memory section 30, in accordance with methods and systems provided. In this embodiment, the switch controller 202 and memory section interfaces 208 need not be included in the switch 22, and the management complex 26 of the storage hub 10 exercises direct control over the switch fabric 206 and server interfaces 204. Thus, in this embodiment the communications channel interface 46 of the memory section 30 directly connects to the switch fabric 206.

In an alternative embodiment to that of FIG. 6 and 7, the selector 44 need not be included and all memory interface devices 64 may be connected to the switch fabric 206.

Figure 8:
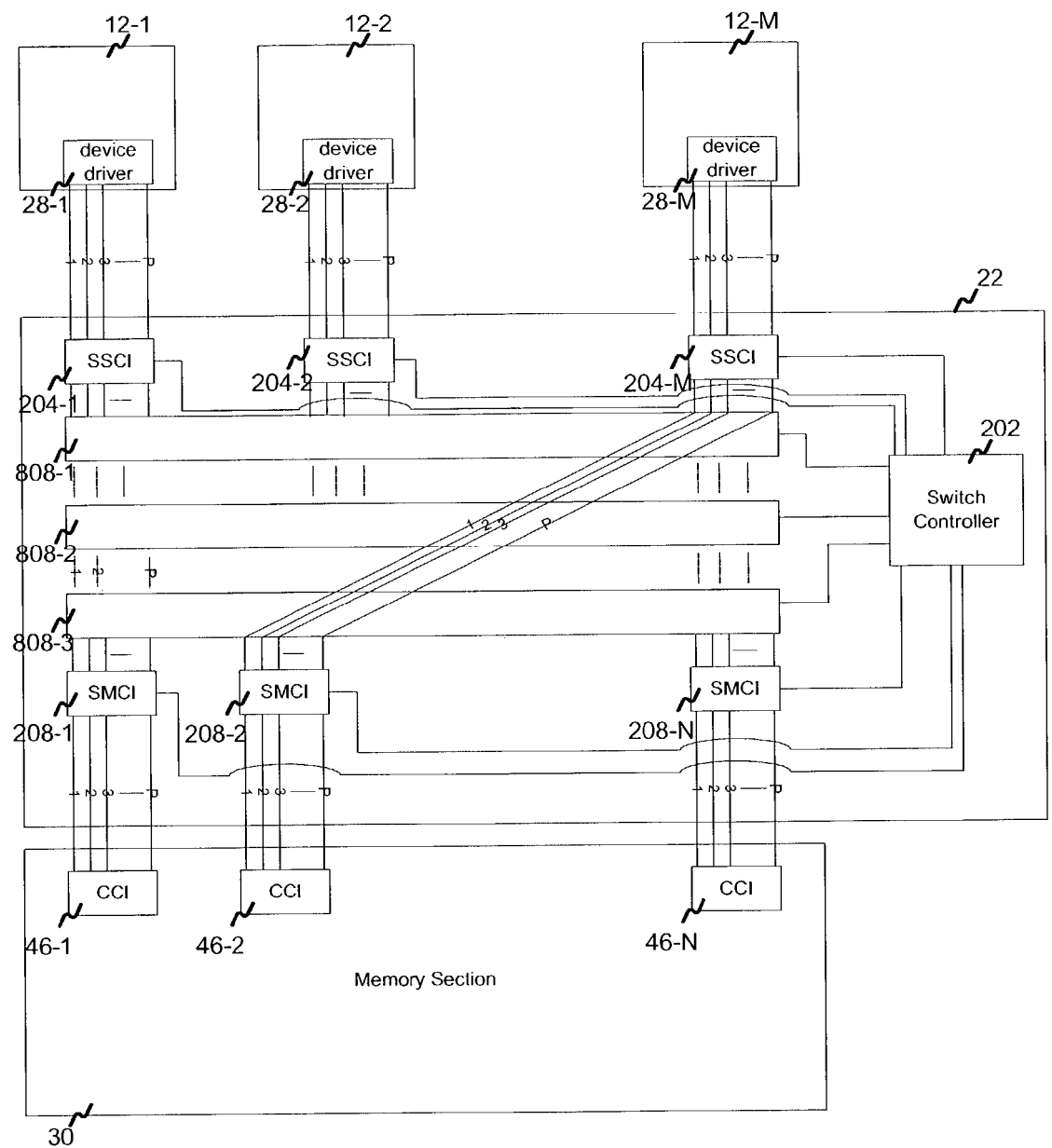
FIG. 8 illustrates a diagram of an alternative exemplary switch, in accordance with methods and systems provided.

FIG. 8 illustrates a diagram of an alternative exemplary switch 22 that may be used in the storage hub 10, in accordance with methods and systems provided. More particularly FIG. 8 illustrates a switch 22 for connecting one or more memory sections 30 to one or more servers 12. This example illustrates M servers 12-1, 12-2, . . . 12-M connected to a single memory section 30. In this example, the server interfaces 204 of the switch 22 include M switch/server communications interfaces (SSCI) 204-1 thru 204-M, and the memory section interfaces 208 of the switch include N switch/memory section communications interfaces (SMCI) 208. Additionally, the switch fabric 206 of the switch 22 includes one or more switching planes 808.

In this example, the servers 12 each includes a device driver 28, and the memory section 30 includes one or more communications channel interfaces (CCI) 46-1 thru 46-N. In this example, P parallel lines connect each device driver 28 to the switch 22 and each CCI 46 to the switch 22. Although in this example, the number of lines in each connection is equal, in other examples they may be different. The device driver 28 may be, for example, the above-discussed device driver 28, or may be included in the device driver 28.

Any of the M servers may generate and transfer a data request from its device driver 28 to a memory section 30 via the switch 22. A server 12 may include in the data request a data block identifier that identifies a particular data block it wishes to write or a data block in the storage hub 10 that it wishes to read. The corresponding SSCI 204 of the switch 22 then receives the data request and forwards it to the switch controller 202. The switch controller 202, in this example, determines the memory section 30 to which the information request is destined from the data block identifier included in the data request.

To determine the memory section 30, the switch controller 202 may, for example, consult a table that defines the relationship between data block identifiers and memory sections, use an algorithm to compute the address, or use some other technique.

Once the memory section is determined, the switch controller 202 then may establish a transmission path through each switching plane 808 for each of the parallel lines P from the device driver 28 to the SMCI 208 corresponding to the determined memory section 30. The data request may also be modified by the switch controller 202 to contain a new address that may be used by the switch 22 in directing the data request to the correct memory section 30. The modified data request is then transmitted across the switching planes 808 to the SMCI 208. This transmission across the P lines may be synchronous.

While the path through the switch is established, the data may reside in a separate storage queue (not shown) in the switch or in a memory (not shown) for the switch controller 202. The data request may also be copied and further modified by the switch controller 202 in accordance with any particular requirements of the storage hub 10. For example, as previously discussed, the management complex 26 may instruct the storage hub 10 to back up all data that is written to the storage hub 10 or to one or more particular memory sections 30. In such an example, the switch controller 202 may copy the write data request including the data to be stored and modify the request in accordance with any particular requirements of the CDA 16. Then, the switch controller 202 may then establish a path for sending the write data request to the CDA 16 and then send the modified copy of the request to the CDA 16, so that the write data is backed up. Likewise, subsequent data blocks that comprise the write request may also be sent to the memory device 30 are copied and sent to the CDA 16. The management complex 26 may, for example, provide the switch controller 202 with any required information and software needed by the switch to determine how to modify data requests, provide multiple destinations with copies of modified data requests, and provide multiple destinations with copies of data.

When a memory section 30 sends information such as data blocks to a server 12, the data blocks from the memory section 30 arrive at the switch 22 through the SMCI 208 corresponding to the CCI 46 for the memory section 30 sending the data block. The data blocks may include an identifier that is inserted into the data by the memory section 30. The memory interface devices of a memory section 30, for example, may insert this address, as described below. Further, this address may be for example a data block identifier identifying the particular data block that was read from the memory section 30, or a port or device to which the data is to be sent. In this example, P parallel lines connect each CCI 46 to the switch 22, although the number of lines in each connection may be different. Further, P may be any number greater than or equal to 1.

The SMCI 208 then forwards the data block to the switch controller 202, which determines the server 12 to which the data block is destined from an identifier (e.g., data block identifier, destination address, etc.) within the transmitted data. The switch controller 202 then establishes with this destination address or data block identifier, for each of the P lines from the CCI 46, a path though the switch 22 to the SSCI 204 to which the data is to be sent. The switch 22 then transfers the data block across the switching planes 808 to the SSCI 204. The transmission of a data block across the P lines may be, for example, synchronous.

Figure 9:
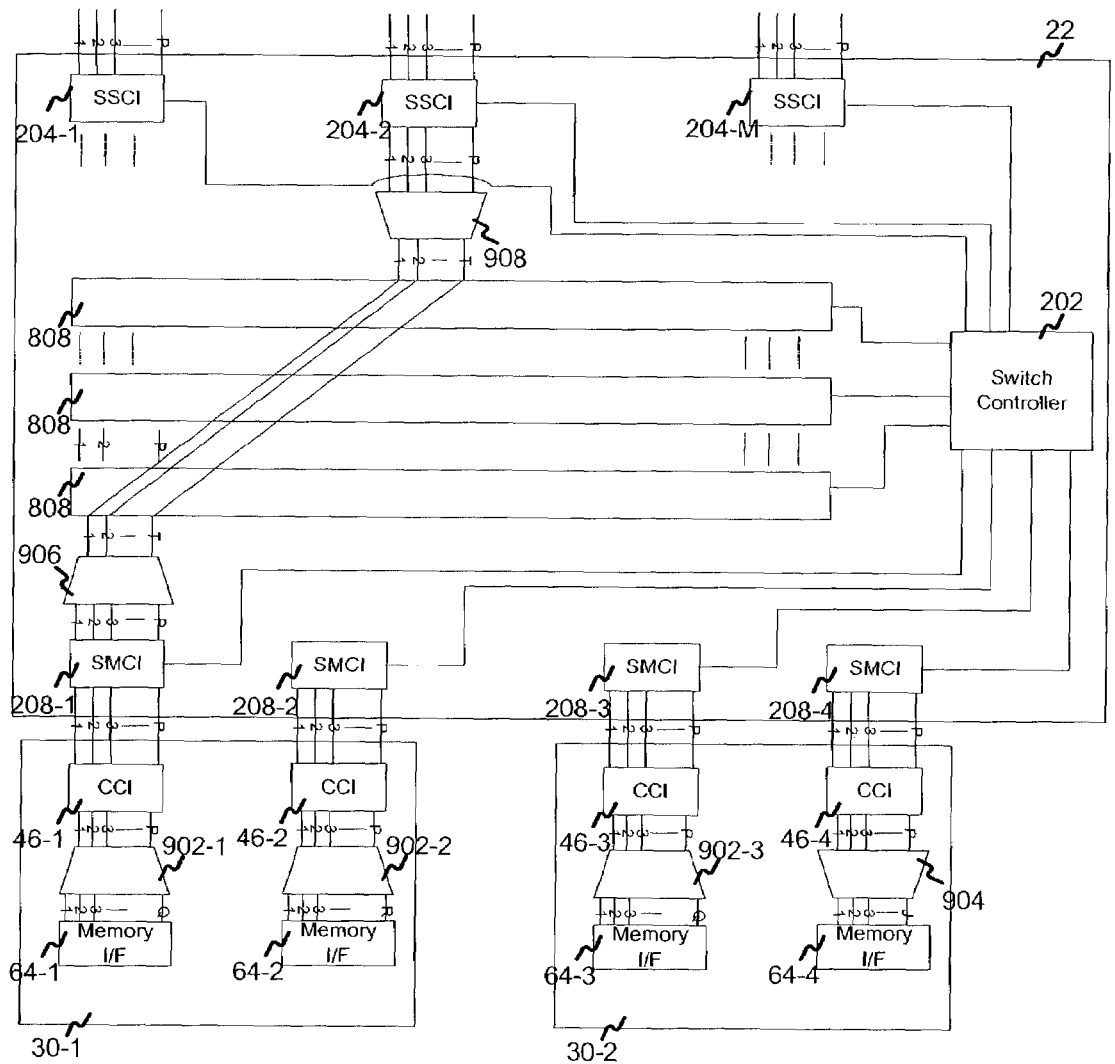
FIG. 9 illustrates a diagram of an alternative switch, in accordance with methods and systems provided.

FIG. 9 illustrates an alternative switch 22 connected to one or more memory sections 30, in accordance with methods and systems provided. In this example, muxing (the combining of several data streams into fewer data streams, each on its own communications path) and demuxing (the separation of a set of data streams into more data streams, each on its own communications path) are used in both the memory section 30 and the switch 22. In this example, P parallel lines connect each memory section's CCI 46 to the switch 22, although the number of lines in each connection may be different.

In this example, in memory section 30-1, Q lines emanate from memory interface device 64-1 and R lines emanate from memory interface device 64-2. A corresponding mux (902-1 and 902-2) then multiplex the lines from each of these memory interface devices (64-1 and 64-2) into P streams, where, Q and R are positive integers greater than the positive integer P.

In memory section 30-2, J lines emanate from memory interface device 64-4, where J is a positive integer less than P. A demux 904 then demuxes these J lines to P lines.

The P parallel lines (streams), however, may also be muxed or demuxed anywhere along the switching path. For example, as illustrated, the P lines muxed into T-line by mux 906 after the SMCI 208-1. The T-lines are then passed through the switching planes 808 to demux 908, which demuxes the T-lines into P lines and passes the P-lines to an SSCI 204.

Additionally, in embodiments employing a memory interface device including a shift array, one or more pipeline shift registers (not shown) may be inserted at points in the transmission and switching path to maintain the clock frequency of those transmissions at the appropriate multiple (muxing function) or sub-multiple (demuxing function) of the clock frequency of the memory interface device shift register array. For example, a shift register pipeline may be included in the CCI 46.

Figure 10:
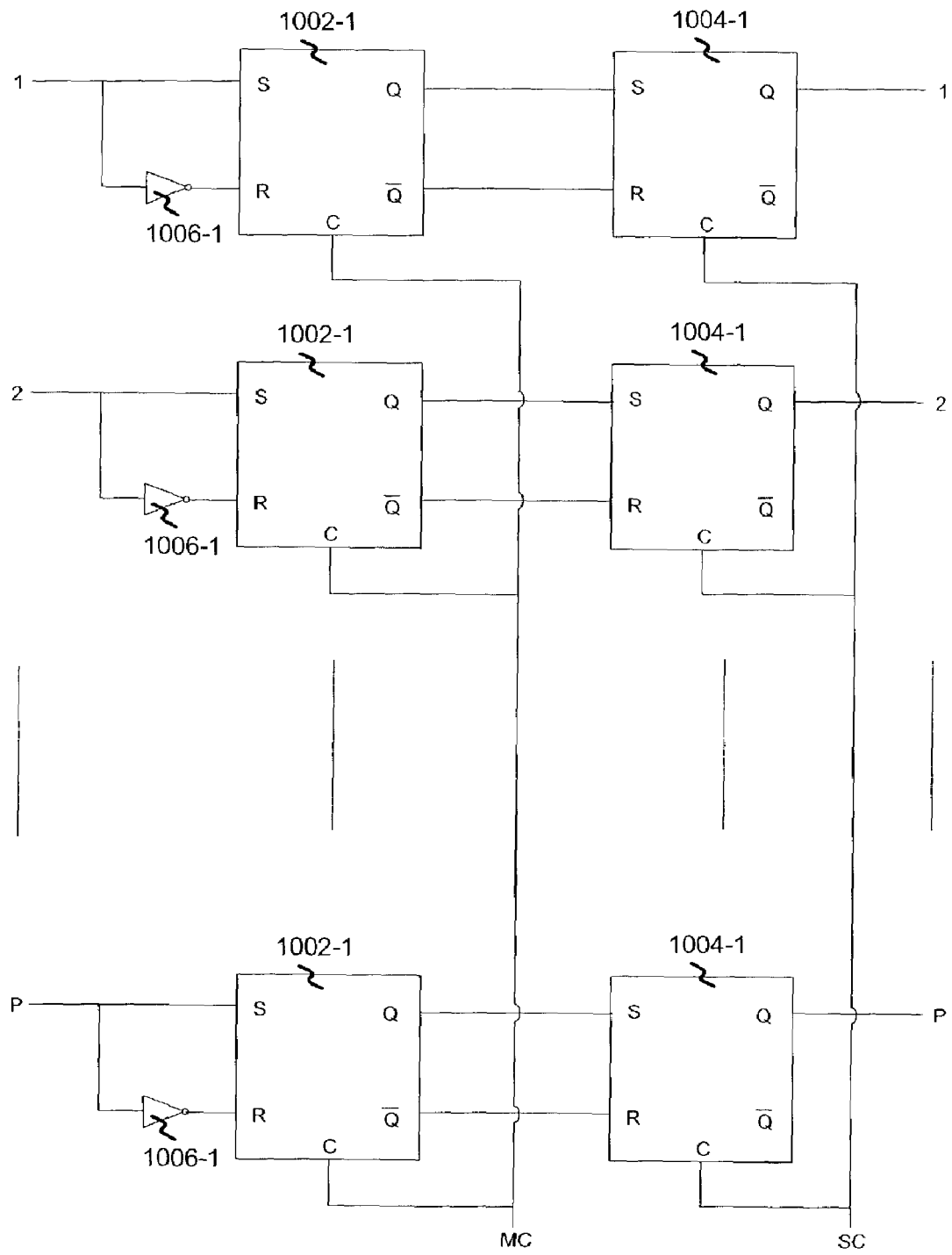
FIG. 10 illustrates an exemplary pipeline shift register, in accordance with methods and systems provided.

FIG. 10 illustrates an exemplary pipeline shift register, in accordance with methods and systems provided. For this example, this pipeline shift register is inserted at the outputs of the CCI 46, such that each of the P lines exiting a CCI 46 are attached to a latch shift register 1002-1, 1002-2 . . . 1002-P. As illustrated, each of the P lines is attached to the S input of the latch shift register, and its inverse is connected to the R input of the latch shift register. The latch shift registers, further receive a master clock signal that may be generated by a master clock circuit for the storage hub 10. This master clock signal may be used by other components in the storage hub 10, such as, for example, the memory sections. The master clock signal may be, for example, generated by the management complex 26 or separate circuitry may be used.

The output, Q, from the latch shift register 1002 is then fed to the S input of a second latch register 1004, and the inverse of the output, $\overline{Q}$, is fed to the R input of the latch shift register 1004. The second latch shift registers 1004 receive a slave clock signal. This slave clock signal may be produced by the same circuitry providing the master clock signal, and the slave clock signal may be, for example, the inverse of the master clock signal. The outputs, Q, from these second latch shift registers 1004-1,1004-2, . . . , 1004-P then provide the signal to the P lines exiting the memory section 30. Although this description of a pipeline shift register was made with reference to latch shift registers, other types of shift registers may be used, such as, for example, dynamic shift registers. Further, although this description of a pipeline shift register was made with reference to attaching the pipeline shift registers to the outputs of the CCI 46, pipeline shift registers, may be included elsewhere in the storage hub 10, such as, for example, at any communications interface or between the switching planes 808.

Memory Interface Device

Figure 11:
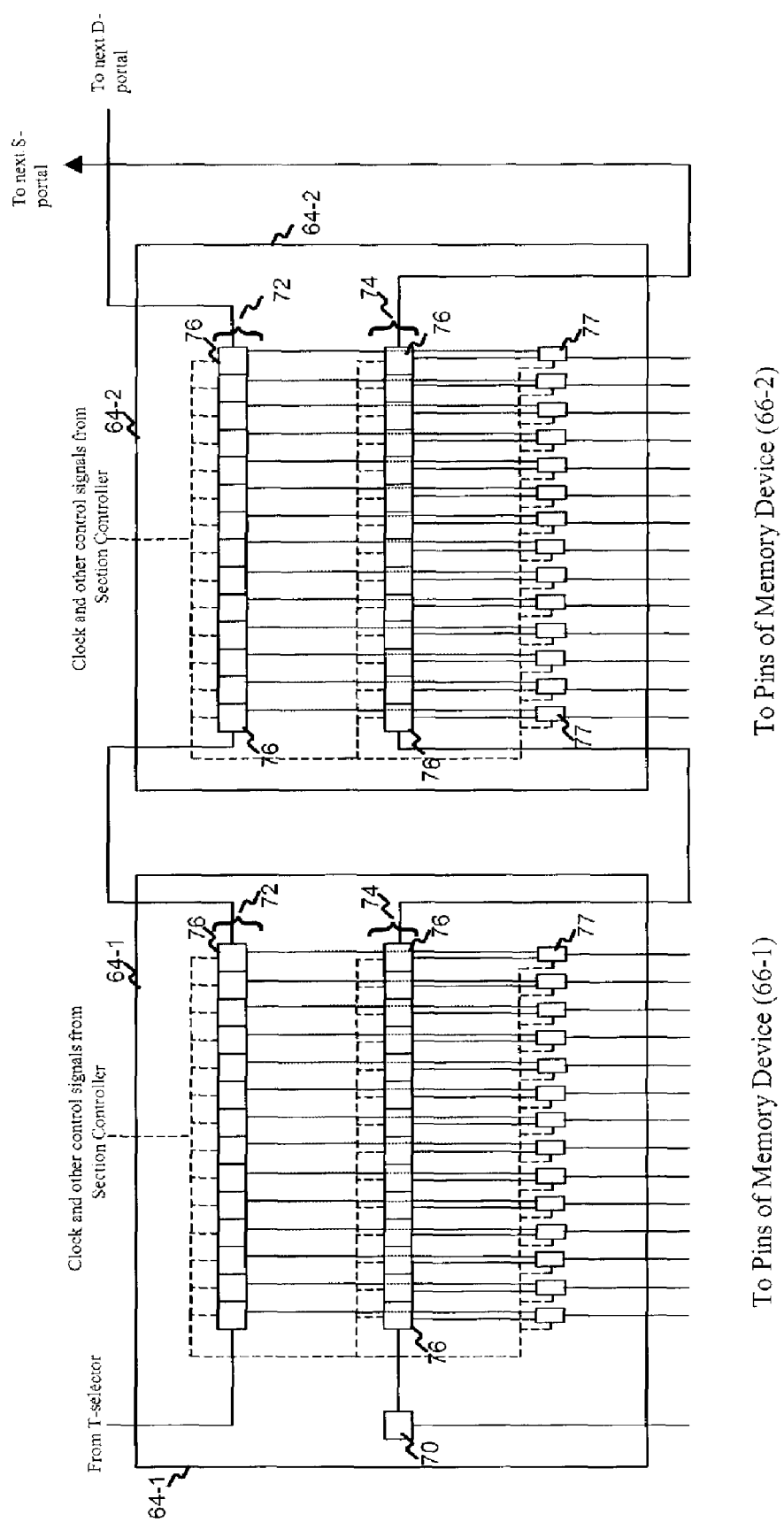
FIG. 11 includes a more detailed block diagram of an exemplary embodiment of a memory interface device, in accordance with methods and systems provided.

FIG. 11 includes a more detailed block diagram of an embodiment of a memory interface device 64, in accordance with methods and systems provided. As shown in FIG. 11, the memory interface devices 64-1 and 64-2 may each include a write shift register array 72 and a read shift register array 74. Both the read and write shift register arrays can include a plurality of shift registers 76 interconnected in series. Each shift register 76 of the shift register array (72 and 74) is connected to a connector circuitry 77 which connects the shift register 76 to a corresponding I/O pin of the memory device 66.

As used herein, the term "shift register" refers to any register, device, stage or anything else with one or more selectable inputs that allows a signal to be received at an input and then output on the occurrence of some event, such as, for example, a control or clock signal. Although the term shift register sometimes refers to not just a single register stage, but also to a series of such registers, as used herein the term shift register refers to a single stage. A series of these shift registers is referred to herein as either a shift register chain, or a shift register string. The series set of registers is also sometime referred to as a "series array of (shift) registers" or shift register array that may be either a single chain of shift registers or parallel chains of shift registers. For example, the shift registers may be any type of shift register, whether dynamic or latching, whether single clock or master/slave clock, whether sampling or edge trigger, whether data (D), RS, or JK, or a stage of a charge coupled device (CCD), or any other type of device that shifts its input to an output on the basis of clock signal. The shift register arrays/chains may include any number of shift registers without departing rom the scope of the invention.

In this embodiment, all the write shift register arrays 72 of the memory section 30 are interconnected to form a longer chain of write shift register arrays. As illustrated, the shift register array 72 of memory interface device 64-1 is connected via the top right I/O pin of memory interface device 64-2 to the write shift register array 72 of memory interface device 64-2 via its top left I/O pin. The write shift register array 72 of memory interface device 64-2 is then connected to the write shift register array 72 of the memory interface device 64-3, and so on, such that all the write shift register arrays 72 of the memory section form a single chain of write shift register arrays. For ease in explanation with regard to this particular example, the shift register arrays of each memory interface device will be referred to as a shift register array, and the interconnection of these shift register arrays to form a longer chain of arrays will be referred to as a shift register chain.

Further, in this embodiment, the bottom right I/O pin of memory interface device 64-1 connects to the bottom left I/O pin of memory interface device 64-2 such that their read shift register arrays 74 form a chain. Referring to FIG. 5, note that in this example the memory interface devices 64-3 and 64-4 are likewise connected, and so on. These pairs of read shifter register arrays 74 will be referred to as read chains.

The first memory interface device in each read chain also includes a read selector 70 that is connected to the read shift register array 74. This read selector 70 is used for inserting an identifier (e.g., a destination address, data block identifier, etc.) and/or other header information into the read data. The identifier is an identifier that the switches 22 preferably use to switch the data to its appropriate destination. The identifier may be, for example, an identifier for the data being transmitted (e.g., a data block identifier) or a destination address identifying an address to which to send the data. For example, if the destination is a computer connected to the Internet, the destination address could be an IP address for the computer. Alternatively, the destination address could simply be an internal address for the switches 22 to use in routing the data to its destination server, in which case the server 12 will read and replace with a destination address that the network over which the data will travel uses to route the data to the appropriate destination.

The memory interface device 64 may also receive control and timing signals from the timing circuitry 61 of the section controller 54. These control and timing pulses may be timed such that the data read from or written into a memory device 66 using the respective pulses are read or written in such a manner that the shift registers 76 of the memory interface device maintain their shifting as if only a shift was taking place. For a further description of memory interface devices incorporating shift registers, please see the aforementioned U.S. patent application Ser. No. 10/284,198 by William T. Lynch and David J. Herbison, entitled "Methods and Apparatus for Improved Memory Access," which was incorporated by reference herein in its entirety. Additionally, data transmitted by a memory interface device 64 may, for example, be transmitted in common mode, differential mode, or in any other manner as deemed appropriate by the system designers.

Exemplary Writing Operation

Figure 12:
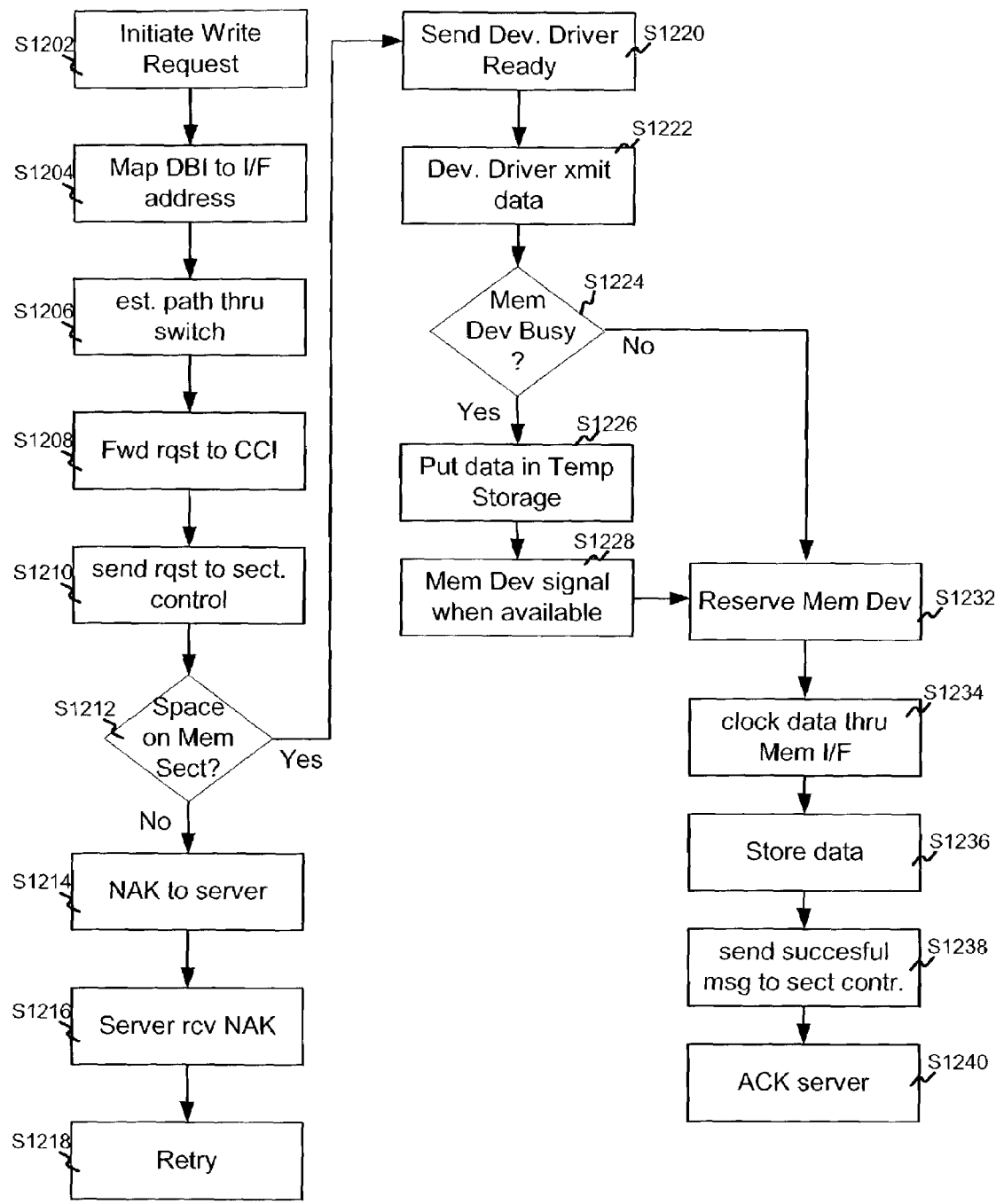
FIG. 12 illustrates a flow chart for an exemplary writing operation, in accordance with methods and systems provided.

FIG. 12 illustrates a flow chart for an exemplary writing operation for the memory section 30 of FIG. 5 with reference to FIGS. 1, 6, and 11, in accordance with methods and systems provided. This flow chart illustrates but one example of a writing operation, and other methods may be used for implementing a write operation without departing from the scope of the invention. In this example, the memory devices 66 of the memory section 30 are partitioned into data blocks, where each data block is identifiable by a data block identifier. A more thorough description of data blocks and partitioning of memory devices are presented below.

A write request may originate, for example, from a user connected to a server 12 via, for example, a network. In this example, it is assumed that the user sends a block of data (i.e., a data block) that is to be stored by the storage hub 10. A device driver 28 in the server then may determine a data block identifier for the data block to be stored and send the request, including the data block identifier (DBI), to a switch 22 within the storage hub 10 (Step 1202). The device driver 28 may, for example, determine the data block identifier using standard methods, such as for example, the server 12 may be executing Oracle or a similar type application, which may be used to determine the data block identifier.

The switch 22 then may use the data block identifier (DBI) to direct the data request to the memory section 30 that is to store the data block by, for example, determining, based on the DBI, an address for the memory section that the switch 22 uses to route the data request to the memory section (Step 1204). For example, when a data request arrives at an SSCI 204 of a switch 22, the SSCI may, for example, direct the data request to the switch controller 202, which may then, use a table to look up the address corresponding to the DBI, use an algorithm to compute the address from the DBI, or use some other method.

The switch controller 202 may then establish a path through the switch fabric 206 from the SSCI 204 to the SMCI 208 corresponding to the memory section where the data will be stored (Step 1206). If there is no idle communications channel between the switch 22 and the memory section 30 or if there is a conflict, the switch may send a congestion message to the requesting server 12, which may then queue the message until the conflict is resolved. In an embodiment of a switch 22, such as that illustrated in FIG.

7, the management complex 26 may perform the functions described above as being performed by the switch controller 202.

Next, the switch 22 then forwards the data request to the CCI 46 of the memory section 30 (Step 1208); the CCI 46 then may direct the request to the section controller 54 (Step 1210). The section controller 54 identifies the data request as a write request, and determines if one of its memory devices has space to store the data (Step 1212). For example, the section controller 54 may identify the request as a write request by information contained in the request itself, by the format or size of the data request, or by some other method. If there is no available memory device 66, the section controller 54 sends a negative acknowledgement, NAK, message (Step 1214), through the CCI 46 and switch 22 to the requesting server 12, which, after receiving the NAK (Step 1216), may attempt to rewrite the data to the storage hub 10 using the same or a different DBI (Step 1218), may attempt to write to another device (not shown), or may inform the application.

If space is available, the section controller 54 sends a message to the device driver 28 that it may transmit the data to be stored (Step 1220). In response, the device driver 28 transmits the data through the switch 22 to the memory section's 30 communications interface (CCI) 46 (Step 1222). Additionally, the management complex 26 may also direct the switch 22 to also send write data to the CDA 16. For example, the management complex 26 may provide an algorithm to the switch controller 206 which when executed causes all, write data to be sent to both the memory section 30 where the data will be stored and to the CDA 16. The version of the data stored by the CDA 16 will be treated as a back-up version that in the event the memory section suffers a fault may be loaded onto a different functioning memory section.

The selector 44 then directs the data to the temporary store memory interface device 60. The microprocessor 51 of the section controller 54 then checks the state of the memory device 66 where the data is to be stored to determine if the memory device 66 is available or is busy (Step 1224). For example, the microprocessor 52 may store in its RAM 52 a status code for each memory device 66 in the memory section 30 that the microprocessor 51 may consult to determine the availability of the memory device 66. If the memory device 66 is available, the microprocessor 51 sends a message to the memory device 66 through the memory device control circuitry 55 to ready itself for storing the data (Step 1232). If, however, the memory device 66 is busy, the data temporary storage memory interface device 60 stores the data in the temporary memory storage device 58 (Step 1226) and a write request is placed in a queue in the microprocessor's RAM 52 (Step 1228).

When the memory device 66 becomes available, the memory device 66 signals the microprocessor 51 in the section controller 54 via the memory section control circuitry 55. (Step 1230). This may, for example, be accomplished by the memory device 66 sending an interrupt signal to the microprocessor 51 via the memory device control circuitry 55. Then, the microprocessor 51 sends a message to the memory device 66 through the memory device control circuitry 55 to ready itself for storing the data (Step 1232). When the memory device is ready, the temporary storage memory interface device 60 passes the data to the T-selector 62, which, because this is a write operation, passes the data to the memory interface device 60. For example, if the memory device 66 were available at Step 1222, the data need not be stored in the temporary memory storage device 58. The data is then clocked into the shift register array 76 of the first memory interface device 64-1 where it is clocked through the write chain of shift register arrays 76 until it is loaded into the memory interface device 64 corresponding to the memory device 66 to which the data is to be written (Step 1234). The data is then written to the memory device at an address supplied by the section controller 54 of the memory section 30 (Step 1236).

A more detailed description of the connections between the shift register arrays and the memory devices and a method for writing the data is presented in the aforementioned U.S. patent application Ser. No.: 10/284,198 by William T. Lynch and David J. Herbison entitled "Methods and Apparatus of Memory Access" filed on the same day as the present application When the write operation is complete, the memory device 66 informs the microprocessor 51 in the section controller 54 through the memory device interface 55 (Step 1238). The section controller 54 may then send an acknowledgement to the device driver 28 in the requesting server 12 (Step 1240).

The following provides a more detailed description of a technique that may be used in step 1236 for writing the data to the memory device 66. This technique is referred to as memory latching. Memory latches may, for example be edge-triggered or flip flop circuits with common reset lines. That is, the memory device control circuitry 55 may, for example, include one or more of these memory latches along with other appropriate circuitry for performing this technique.

The section controller 54 may reserve memory locations in its internal memory 52 for the management of the memory devices 66, which in this example are assumed to be DIMMs. These memory locations may be anywhere in the internal memory 52 of the section controller 54.

The memory device control circuitry 55 may read the data stored in these assigned memory locations, for example, by reading information being transmitted between the microprocessor 51 and the memory 52 and looking at information addressed to these memory locations. These memory locations may store the starting address for data transfer, the number of binary digits to transfer, along with other control information for the DIMM 66. This control information may include, for example, information regarding whether the operation is a read or a write whether the DIMM 66 should start or terminate operations, etc. Although, the above describes one technique for writing data to a memory device in a memory section, one of skill in the art will recognize that numerous other methods are possible without departing from the scope of the invention.

Exemplary Reading Operation

Figure 13:
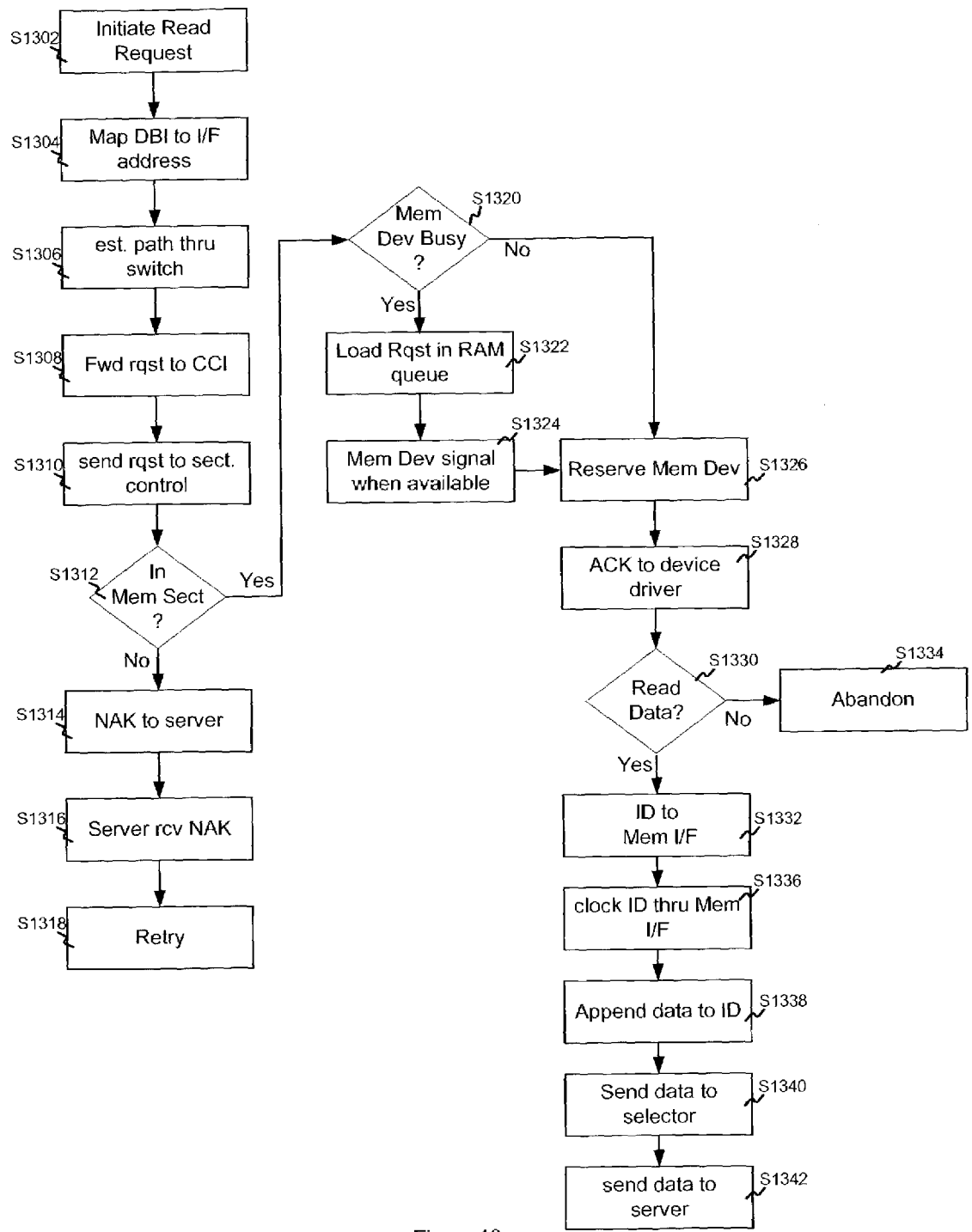
FIG. 13 illustrates a flow chart for an exemplary reading operation, in accordance with methods and systems provided.

FIG. 13 illustrates a flow chart for an exemplary reading operation for the memory section of FIG. 5 with reference to FIGS. 1, 6, and 11, in accordance with methods and systems provided. This flow chart illustrates but one example of a read operation and other methods may be used for implementing a read operation without departing from the scope of the invention. In this example, the memory devices 66 of the memory section 30 are partitioned into data blocks, where each data block is identifiable by a data block identifier. A more thorough description of data blocks and partitioning of memory devices is presented below. A read request may originate from a user connected to a server 12 via a network. A device driver 28 in the server then sends the request, including a data block identifier (DBI), to a switch 22 in the storage hub 10 (Step 1302). The device driver 28 may, for example, determine the data block identifier using standard methods. For example, the server 12 may be executing Oracle or a similar type application, which may be used to determine the data block identifier.

The switch 22 then may use the data block identifier (DBI) to direct the data request to the memory section 30 that stores the data block, for example, by determining based on the DBI, an address for the memory section that the switch uses to route the data request to the memory section 30 (Step 1304). The switch controller 202 may then establish a path through the switch fabric 206 from the SSCI 204 to the SMCI 208 corresponding to the memory section where the data will be stored (Step 1306). In the event there is no idle communications channel between the switch 22 and the memory section 30 or there is a conflict, the switch may send a congestion message to the requesting server 12, which may then queue the message until the conflict is resolved. In an embodiment of a switch 22, such as that illustrated in FIG. 7, the management complex 26 may perform the functions described above as being performed by the switch controller 202. Next, the switch 22 then forwards the data request to the CCI 46 of the memory section 30 (Step 1308). The CCI 46 then may direct the request to the section controller 54 (Step 1310). The section controller 54 identifies the data request as a read request, and determines if one of its memory devices stores the identified data block (Step 1312). For example, the section controller 54 may identify the request as a read request by information contained in the request itself, by the format or size of the data request, or by some other method.

If the requested data block is not stored in the memory section 30, the section controller 54 sends a negative acknowledgement (NAK) message (Step 1314), through the CCI 46 and switch 22 to the requesting server 12. After receiving the NAK (Step 1316), the requesting server 12 may attempt to re-read (Step 1318) the data block from the memory section, may attempt to read the device from another device (not shown), or may inform the application. If the section controller 54 verifies that the memory section stores the requested data block, the microprocessor 51 in the section controller 54 determines which memory device 66 stores the data and checks its state to determine if the memory device 66 is busy or available (Step 1320). For example, as discussed above, the microprocessor 52 may store in its internal memory 52 a status code for each memory device 66 in the memory section 30 that the microprocessor 51 may consult to determine the availability of the memory device 66.

If the memory device is available, the microprocessor 51 reserves the memory device by, for example, changing its state in the section controller's internal memory 52 from available to busy. (Step 1326). The section controller 54 then may send an acknowledgement (ACK) (Step 1328), to the requesting server 12. If the device driver 28 still wants to read the read the data block (Step 1330), it transmits a read confirmation through the switch 22 to the memory section 30 (Step 1332). Otherwise, it abandons the read request (Step 1334).

Upon receipt of the read confirmation, the section controller 54 provides an identifier to the read selector 70 of the first memory interface device 64-1 in the read chain corresponding to the memory device(s) 66 from which the data will be read (Step 1332). As discussed above, the identifier may be, for example, an identifier that the switches 22 use to switch the data to its appropriate destination. The identifier may be, for example, an identifier for the data being transmitted (e.g., a data block identifier) or a destination address identifying an address to which to send the data. For example, if the destination is a computer connected to the Internet, the destination address could be an IP address for the computer. Alternatively, the destination address could simply be an internal address for the switches 22 to use in routing the data to its destination server, in which case the server 12 will read and replace with a destination address that the network over which the data will travel uses to route the data to the appropriate destination.

The identifier (e.g., destination address, a data block identifier, etc) is then clocked through the chain shift register arrays 74 of the memory interface devices 64 until it reaches the memory interface device 64 corresponding to the memory device 66. That is, the memory device 66 that contains the data block corresponding to the data block identifier in the data request (Step 1336). Next, the section controller 54 may then determine, using the data block identifier, the addresses for the memory device 66 corresponding to the storage locations where the data block to be read is stored.

The section controller 54 then provides these addresses to the memory device 66 along with other appropriate control signals. In response, the memory device reads the data and it is loaded into the read shift register chain 74 of the memory interface device 64 such that the identifier (e.g., destination address, data block identifier, etc.) is appended to the front of the data (Step 1338). The addresses and control signals may be provided to the memory device 66 using a technique such as the above discussed memory latching technique.

If the memory device 66 at step 10 was busy, the read request may be queued in the internal memory 52 of the microprocessor 51 (Step 1322). When the memory device becomes available, it may send an interrupt signal to the section controller 54 (Step 1324), which then executes the read request as described beginning at Step 1326.

When the data is clocked out of the shift register chain and sent to the selector 44 (Step 1340), the selector 44, under the control of the section controller 54, connects the data to the appropriate channel of the communications channel interface 46. The data is then passed to the server 12 through the communications interface 208, the switch fabric 206, and the communications interface 204 (Step 1342).

Additionally, data may be, for example, simultaneously read from all memory devices in a chain and simultaneously loaded into the read chain of shift register arrays. In such a situation, the identifier (e.g., destination address, data block identifier, etc.) may, for example, only be inserted at the front of the chain of shift register buses.

Test Operation

A test operation for the embodiment of FIG. 5 will now be described. In certain instances, it may be desirable to test the system using known data. When testing the system, test data and a control signal are sent from the section controller 54 to the T-selector 62 such that T-selector sends the test data to the memory interface devices 64 and the test data may be passed through the system. The test data after being written to and read from the memory interface devices 64 may then be sent to the selector 44, which may be, for example, instructed by the test circuitry 59 to direct the test data to the test circuitry 59. The test circuitry 59 may then check the data using error detection and correction capabilities, such as, for example, parity checks and/or bit level comparisons. If the data are correct, no action is required. If the data are not correct, the test data may be resent. If the data are then correct, no action is required. If not, the section controller 54 may notify the management complex 26 that a fault has occurred and begin to isolate the fault through the error recovery capabilities present in the software it executes. In parallel, the management complex 26 may then execute fault management procedures, such as those discussed above in the section on the management complex 26.

Additionally, the CPU 51 may provide through the Header/Test interface 63 test data to the memory interface devices 64. For example, this data may be sent to one or more of the shift register arrays of 64 in the same manner as destination addresses/data block identifiers and other data. Transmission of the data can be processed through the storage hub 10 in the same manner as any formal data is processed and routed through the storage hub 10. Such test data allows testing of the operations of all shift register arrays, all controls and interfaces, proper identification of server destinations, throughput time, checks on synchronism among the parallel data paths, etc. If desired, such a pathway may also be employed for any desired handshake routines prior to actual data delivery.

Parallelism and Scalability of Storage Hub

The storage hub 10 may exhibit hierarchical parallelism. The phrase "hierarchical parallelism" as used herein refers to parallelism in the memory section, parallelism between the memory section and the switch fabric, and parallelism among all the memory sections through the switch fabric's connections to servers.

In this example, so long as the requested data are resident in different memory devices 66, the memory section 30 itself may support N simultaneous reads and one write, where N is the number of communications channel connections available to the memory section 30 and preferably does not exceed the number of memory devices 66. For example, as illustrated in FIG. 5, the communications channel interface 46 has 4 communications channels connections for transmitting and receiving information. The switch 22 preferably can handle simultaneous read requests and write requests that it can fulfill. The section controller 54 of the memory section 30 preferably manages the reading and writing of data to the memory devices 66 and manages any conflicts. The section controller 54 of the memory section 30 manages conflicts through the capabilities present in the software it executes. For example, the section controller 54 may direct that write requests have a priority than read requests with the lower priority requests being queued. For example, as previously discussed, the data for write requests may be queued in the temporary storage device 58, and that write and read requests may be queued in the internal memory 52 of the section controller 54. The management complex 26 may direct the section controller 54 to resolve conflicts using other methods such as, for example, a first-to-arrive/a-first-to-be-processed algorithm.

In this example, parallelism of the memory sections 30 may be further augmented by parallelism among memory sections 30. That is, at any point in time and so long as the number of memory sections 30 is at least as great as the number of server connections, S, from the storage hub 10, then as many as S memory sections may be accessed. In the event the storage hub 10 has more server connections than memory sections, then, in this example, the number of simultaneous transactions equals the number of memory sections.

In addition, the storage hub 10, in this example, may also be scalable. More particularly, if increased capacity is demanded from the storage hub 10, this increased capacity may be handled by, for example, adding additional memory sections 30 and cabinets to house them, including backup power, higher capacity and/or additional switches 22, and/or increasing the number and/or capacity of the connections to the storage hub 10. Additionally, as the capacity of the storage hub 10 is increased, the capacity and/or number of management complex processors (32 and 34) may be increased, if necessary, to ensure that the management complex 26 has sufficient capacity to monitor the respective states of the storage hub's memory sections 30

Additionally, in this example, the memory sections 30 may also be scalable. For example, increased capacity of a memory section 30 may be obtained by, for example, adding additional memory devices 66, memory interface devices 64, and/or communications channel interfaces to the memory section. Preferably, the section controller 54 for each memory section includes a sufficiently large resident memory for holding a "map" of the location of each data block resident in its memory section 30. Commercially available microprocessors may be used by the section controller for storing this map.

A scalable architecture may initially be deployed wherein the storage hub includes only one or a few memory sections each including only small number of memory devices. Then, as increased capacity is demanded of the storage hub, this increased capacity may be managed, for example, by adding additional and/or higher capacity memory sections to the storage hub additional cabinets and backup power to house the additional memory sections, increasing the capacity of the existing one or more memory sections, increasing the capacity of the management complex 26 through the addition of control processors 34 or administration processors 34, increasing the number and/or capacity of the switches 22 through the addition of more ports and/or switch controllers as needed. Thus, as the storage hub's capacity is increased, the performance seen by any given user preferably remains uniform as the system grows, and expected response times for users with applications generating random data requests preferably remains uniform as the system expands.

Partitioning

Figure 14:
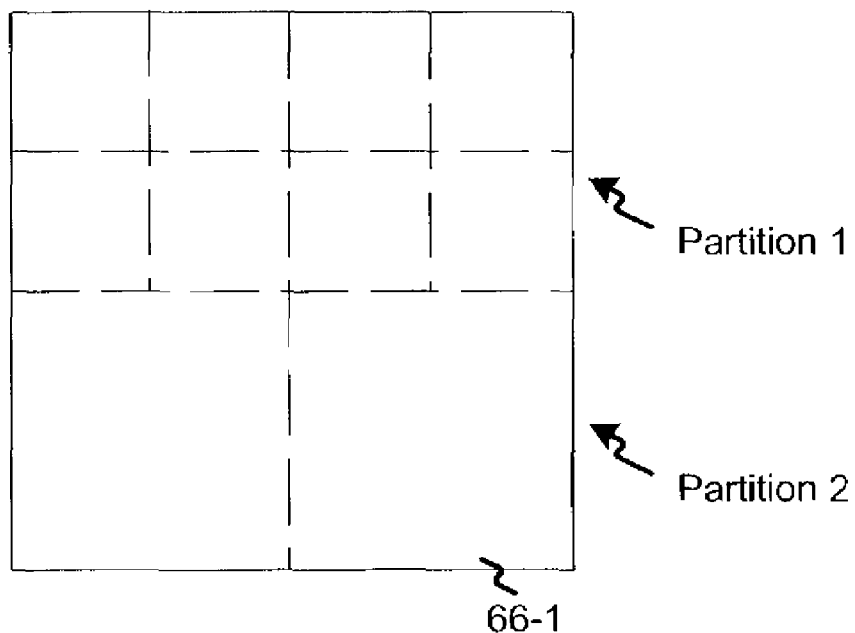
FIG. 14 illustrates a logical diagram of partitioned memory devices, in accordance with methods and systems provided.
Figure 14:
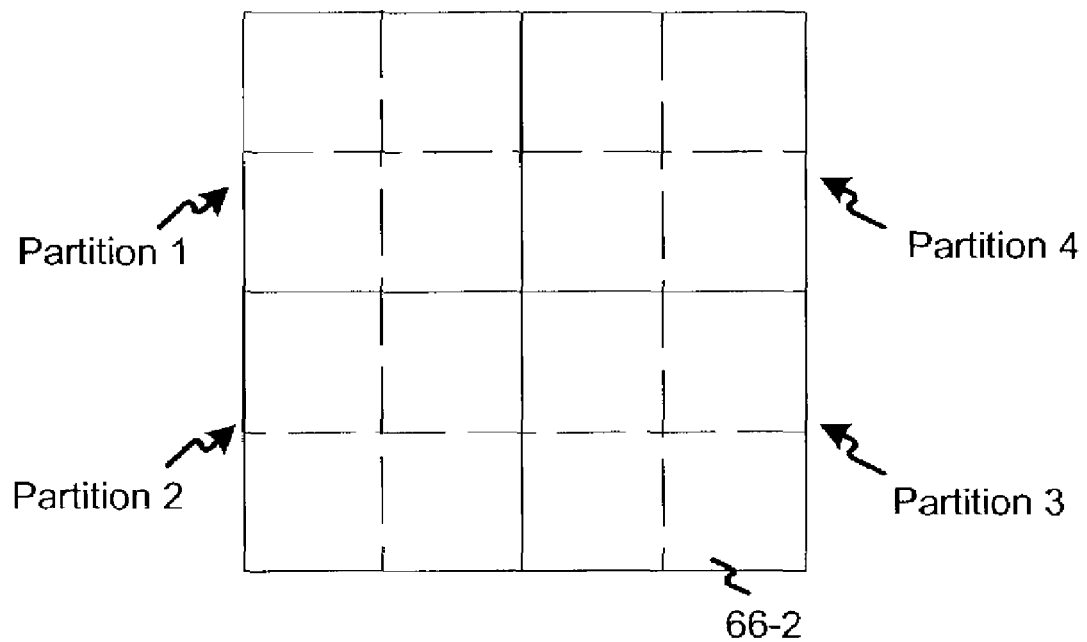

FIG. 14 illustrates a logical diagram of N memory devices 66, in accordance with methods and systems provided. As discussed above, the memory devices 66 may be solid state memory devices that can store B bits, and the number of bits that each memory device can store may be different. In one example, the management complex 26 may send a command to the section controller 54 of a memory section 30, instructing the section controller 54 to reconfigure a memory device 66 in the memory section 30 into a number of partitions including one or more data blocks each having a particular block size, where the block size is the number of bits in the block. Use of differently sized data blocks and data block partitions allows the storage hub to suit its storage structure to different applications whose data are stored on the same storage hub. For example, an application like an online catalog that always stored text and an image or images should preferably prefer a larger block size than an application like a customer reservation system that stored only text. Since the partitions and block sizes can be reconfigured at will through commands from the management complex, new data for new applications may be loaded into the storage hub without have to stop its operations or affect data in other memory sections that are not being changed.

As illustrated in FIG. 14, memory device 66-1 has two partitions, where the first partition includes eight blocks and the second includes two blocks. In this example, the block size of the data block in the first partition is smaller than the data blocks in the second partition. Memory device 66-2, in contrast, has four identical partitions of four blocks each, where each data block is of equal size Additionally, in this example, the management complex 26 may dynamically adjust the data block size in each partition, modify the partitions, or add or delete partitions. For example, at any time the management complex 26 may instruct the section controller 54 of a memory section 30 to reconfigure the memory devices 66, wherein the current partition may have no effect on any subsequent partition.

Alternative Memory Interface Device

Figure 15:
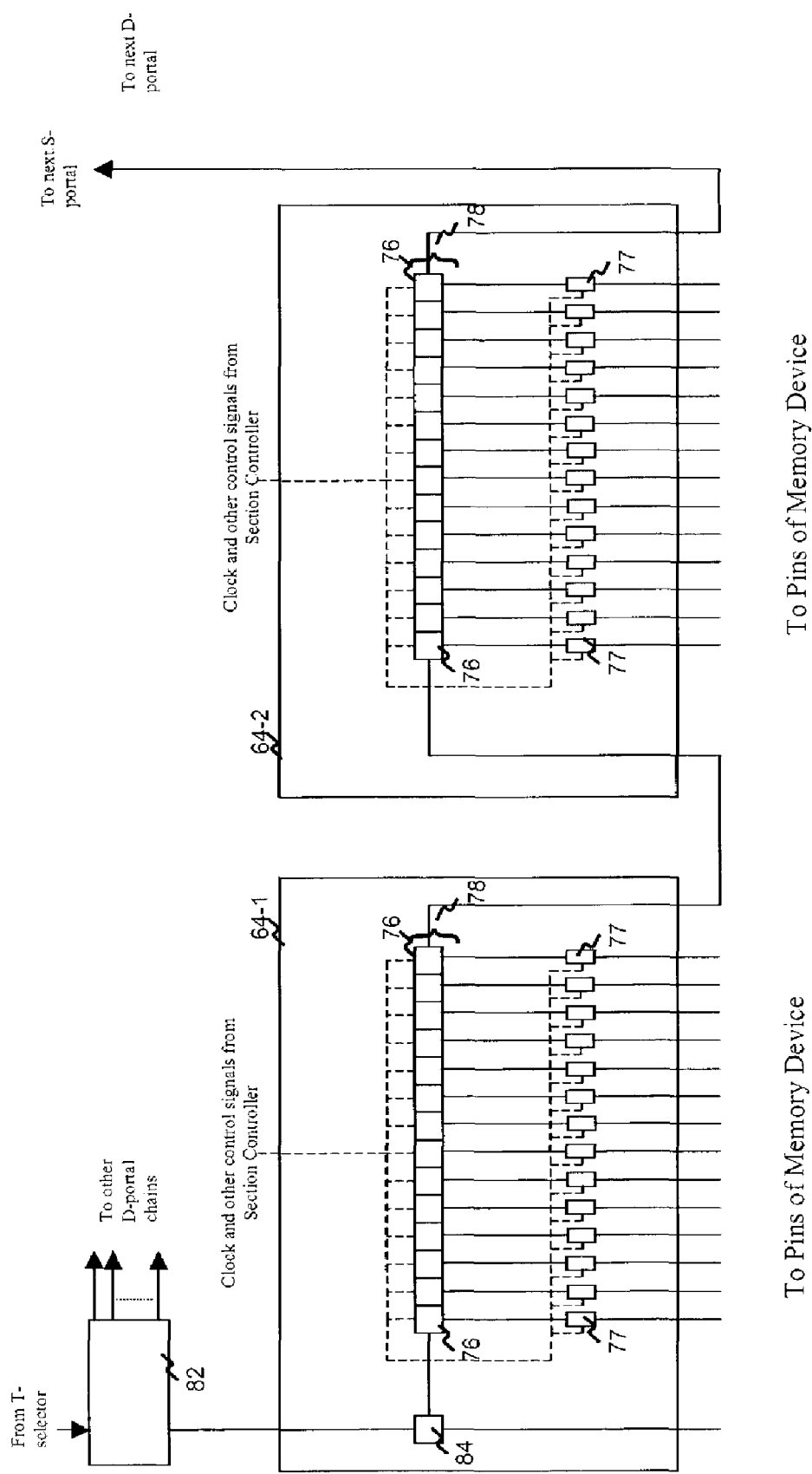
FIG. 15 illustrates an alternative embodiment of a memory interface devices, in accordance with methods and systems provided.

FIG. 15 illustrates an embodiment wherein the memory interface devices use a common shift register array for reading from and writing to the memory device, in accordance with methods and systems provided. As illustrated, each memory interface device 64 includes a shift register array 78 of a plurality of shift registers 76 interconnected in series. Further, like the embodiment of FIG. 11, these memory interface devices are connected in pairs to form a chain.

As illustrated, the shift register array 78 of memory interface device 64-1 is connected to the shift register array 78 of memory interface device 64-2, which is in turn connected to the selector 44. Further, because there is not a separate write chain, the I/O pins in the upper right and left of the memory interface devices 64 shown in FIG. 5 are not necessary. Additionally, the memory interface devices of this embodiment use a write selector 82. The operation of the write selector 82 will be described in more detail below.

The following provides a description of exemplary write operation for the embodiment of FIG. 15. Data to be written to the memory devices 66, as in the above embodiment of FIG. 11 is forwarded through the Temporary storage interface device 60 to the T-selector 62 under the control of the section controller 54. In this embodiment, because there are separate chains for writing the data, the data is forwarded to the chain corresponding to the memory device 66 where the data is to be stored. The T-selector 62, therefore, passes the data to the write selector 82, which receives a control signal from the section controller 54 such that the write selector 82 sends the data to the appropriate chain of shift register arrays.

The signal is then passed to the read selector 76 of the first memory interface device 64-1 (in this example) in the chain. Because, this is a write operation, the data is clocked into the shift register array 78 and is clocked through the shift registers until it is loaded into the shift register array 78 corresponding to the memory device 66 to which the data is to be written. The data is then written to the memory device 66. Methods and systems for writing data from a shift register array 78 to a memory device 66 are presented in more detail below.

An exemplary reading operation for the embodiment of FIG. 15 will now be described. First, an identifier (e.g., destination address, data block identifier, etc.) for the data is supplied to the read selector 84 from the section controller 54. The destination address is then clocked through the chain of shift register arrays.

Next, the data is loaded from the memory device 66 into the shift register array 78 such that the identifier (e.g., destination address, data block identifier, etc.) is appended to the front of the shift register array. The data is then clocked through the chain of shift registers 76 until it is passed to the selector 44. The data is then passed to the end user through the server 12 as was described with reference to FIGS. 5 and 11.

Additionally, as in FIG. 11, test data may be inserted into the memory devices 66 and passed through the system using the T-selector 62.

As will be obvious to one of skill in the art, other embodiments of the memory interface device are possible, without departing from the scope of the invention. For example, although each memory interface device is described as only having one read or write shift register array, the memory interface device may include any number of write or read chains of shift register arrays. Further, the shift registers 76 rather than being 1 bit shift registers may be of any depth. For example, the shift register arrays could be, for example, N×M arrays such as, for example, 2×8, 4×32, 8×16, etc. arrays as determined by the system designers for their particular implementation. Additionally, the shift registers arrays may be configured in a ring, such that the data once loaded into a chain circulates synchronously in the chain. A more detailed description of memory access using shift register arrays is set forth in the aforementioned U.S. patent application Ser. No. 10/284,198 by William T. Lynch and David J. Herbison entitled "Methods and Apparatus for Improved Memory Access" filed on the same day as the present application.

Alternative Memory Section

Figure 16:
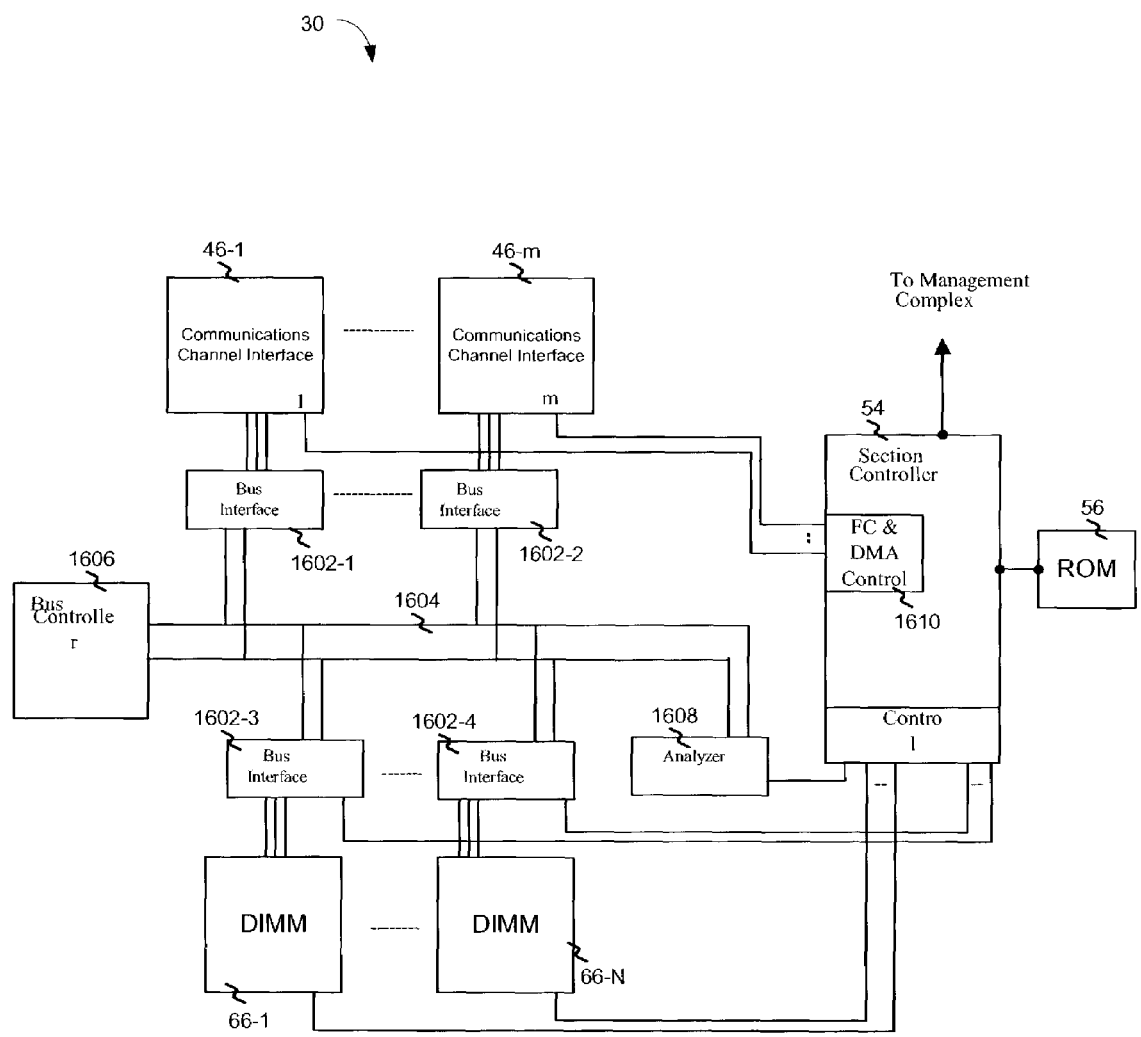
FIG. 16 illustrates an alternative memory section, in accordance with methods and systems provided.

FIG. 16 illustrates an alternative memory section 30, in accordance with methods and systems provided. These memory sections are provided as exemplary mechanisms that could be employed to practice the invention, and are not intended to limit the scope of the claims.

As illustrated, the memory section 30 includes one or more communications channel input/output interfaces 46-1 and 46-m, a section controller 54, one or more bus interfaces 1602, a bus 1604, a bus controller 1606, an analyzer 1608, and one or more memory devices 66-1 and 66-n. In this example, the bus 1604 uses the Peripheral Component Interconnect (PCI) standard. Each device is preferably connected to the bus via a bus interface 1602, which in this example is a PCI interface. The bus controller 1606 in this example is a PCI bus controller for arbitrating which device may control the bus. Additionally, in this example, an analyzer circuit 1608 monitors the state of the PCI bus 1604 and informs the section controller 54 of the real time state of the bus 1604.

The communications channel input/output interfaces 46-1 and 46-m may be any type of communications channel interfaces, such as Fibre Channel, Telecommunications Control Protocol/Internetworking Protocol (TCP/IP) over Ethernet, Token Ring, etc. In this example, the communications channel input/output interfaces 46-1 and 46-m use the Fibre Channel protocol. A commercially available Fibre Channel I/O component embodied on a chip may be used as the communications channel I/O interfaces 46. These commercially available chips typically include a microprocessor for executing layer 2 and 4 protocol engines, a 2.125 Gbit transceiver, a data codec, a transmit FIFO queue, and a receiver FIFO queue. The Fibre Channel I/O components' microprocessor is capable of receiving commands from the section controller 54 regarding control of the PCI interfaces 1602 and transferring or receiving information from the memory devices 66. In this example, m number communication channel I/O interfaces are illustrated, where m>=1.

The communications channel I/O interfaces 46 preferably also are capable of receiving control instructions from the section controller 54. For example, the section controller 54 may send and receive control information to and from the communications channel interfaces 46 using the direct memory addressing (DMA) protocol. Additionally, although not shown, the section controller 54 may also send and receive interrupts and I/O commands to and from the communication channel interfaces 46 over one or more I/O control lines.

In this example, the section controller 54 is embodied on one or more chips including an internal random access memory, a read only memory for bootstrap loading, an interface to the Management Complex, and a microprocessor. The section controller 54 may directly control the memory devices 66 through memory latching, as in the above-described embodiment. Additionally, the section controller 54 may receive real time status information about the bus interfaces 1602 from the analyzer circuit 1608. The section controller 54, as illustrated, also includes a DMA interface for sending and receiving control information to/from the communications channel interfaces using the DMA protocol. Although, in this example, the DMA protocol is used, as discussed above any other suitable protocol may be used for sending control information between the communication channel interfaces 46 and the section controller 54.

The read only memory (ROM) 56 may store the software associated with the bootstrap program used by the section controller to obtain its latest software image. This ROM 56 although illustrated as separate from the section controller 54 may be included in the section controller 54.

The bus interfaces 1602 are used to connect the memory devices 66 and communications channel interfaces 46 to the bus 1604, such that these devices may transmit and receive information over the bus 1604. The bus interfaces 1602-3 and 1602-4 in this example connect to the section controller 54 via control lines over which the section controller 54 may send to the bus interfaces 1602-3 and 1602-4 control information. This control information may include, for example, an identifier (e.g., destination address, data block identifier, etc.) for data being read from the memory device 10. Accordingly, the bus interfaces 1602-3 and 1602-4 may also be referred to as memory interface devices 1602-3 and 1602-4.

The memory devices 66, as in the above-described embodiments may be any type of memory devices, such as, for example DIMMs. The section controller 54 preferably controls reading from and writing to the memory devices 66. For example, control lines between the memory devices 66 and the section controller 54 may carry signals from the section controller 54 to the memory devices 66 regarding the address to transfer data to/from, and the number of bits to transfer data to/from the memory device 66. Additionally, the memory devices 66 may be capable of providing the section controller 54 via these control line with a real time interrupt signal when an operation is complete along with information regarding the operational status of the memory device 66. In this example, there are n memory devices 66, where n>=1

The following provides a brief overview of an example for a reading operation for the memory section of FIG. 14. In this example, the communications channel interfaces 46 are preferably fibre channel I/O components. When a data request arrives at the communications channel interface 46, the communication channel interface 46 detects it and sends an interrupt signal to the section controller 54. This interrupt signal preferably includes information regarding the data block to be read from the memory devices. The section controller 54 then maps this data block information to an address in the memory devices. That is, the section controller determines from this data block information the memory devices 66 storing the requested data along with the addresses for this data on those memory devices. The section controller 54 then loads this address information into its internal memory, such that the addresses are transferred to the memory devices as in the above-describe memory latching example.

The requested data block is then read from the memory devices 66 and transferred to their corresponding bus interfaces 1602. Additionally, the section controller 54 transmits an identifier (e.g., destination address, data block identifier, etc.) to the bus interface 1602. The identifier may be, for example, an identifier for the data being transmitted (e.g., a data block identifier) or a destination address identifying an address to which to send the data. The destination address may be, for example, the internal address for the bus interface 1602 corresponding to the communication channel interface 46 to which the data is to be sent. Alternatively, the destination address may be, for example, an address of the server 12 to which the data is destined, an address for use by the switch 22 in switching the information, or any other identifier useful in routing the data towards its destination.

The bus interfaces 1602 then transfer the identifier (e.g., destination address, data block identifier, etc.) and the data over the bus 1604 according to the bus's protocol. In this example, the bus 1604 uses the PCI protocol and the PCI controller 1606 arbitrates any conflicts in accessing the bus 1604.

The bus interface 1602 for the communication channel interface 46 to which the data is sent monitors the bus for data including its address. Because all information is transmitted over the bus, bus interfaces 1602 ignore data not including an address for the bus interface 1602. When the bus interface 1602 for the communication channel interface 46 to which the data is to be transmitted recognizes an address for itself, it reads the data from the bus 1604. The communication channel interface 46 then transmits the data block from the memory section 30. In certain examples, the communications channel interface 46 may also replace the destination address with a new destination address prior to sending the data from the memory section 30.

A write operation for the exemplary memory section 30 of FIG. 14 will now be described. When a write request is received by a communications channel interface 46, the communications channel interface 46 determines that it is a write request and forwards the request to the section controller 54 via the DMA interface 1610. The write request in this example may include a data block identifier indicative of where the memory section 30 is to write the data. The section controller 54 then maps this data block identifier to determine the memory devices 66 to which the memory section 30 is to write the data along with the addresses for the memory devices 66. The section controller 54 provides these addresses to the appropriate memory devices 66.

In addition to sending the write data request to the section controller 54, the communications channel interface 46 obtains the data from the write request and sends the data to the communication channel interface's corresponding bus interface 1602. Additionally, the section controller 54 may supply the communications channel interface 46 with a bus interface address for the bus interface 1602 corresponding to the memory device 66 that will store the write data. The bus interface 1602 then transmits the data and the bus interface onto the bus 1604.

The bus interfaces 1602-3 and 1602-4 for the memory devices monitor the bus 1604 looking for data destined for them. When the bus interface 1602 senses its address is being transmitted, it reads the write data from the bus. Meanwhile, the section controller 54 informs the corresponding memory device 66 to accept write data from its bus interface 1602-3 or 1602-4. The bus interfaces 1602-3 or 1602-4 then provide the data to their corresponding memory device 66 which write the data at the address provided by the section controller 54.

The above description of the preferred embodiments has been given by way of example. From the disclosure given, those skilled in the art shall understand the invention and its advantages, but will also find apparent various changes and modifications that can be made to the methods and structures disclosed. We seek therefore to cover all such changes and modifications as fall within the spirit and scope of the invention, as defined by the appended claims and equivalents thereof. Thus, it is intended that the specification and examples be considered as exemplary only, with a true scope and spirit of the invention being indicated by the following claims.

What is claimed is:

1. A storage system, comprising:
one or more memory sections, including
one or more memory devices having storage locations for storing data, and
a memory section controller capable of detecting faults in the memory section and transmitting a fault message in response to the detected faults; and one or more switches, including
one or more interfaces for connecting to one or more external devices; and
a switch fabric connected to one or more memory sections and the external device interfaces and interconnecting the memory sections and the external device interfaces based on an algorithm; and
a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm,
wherein an interface of the switch is connected to a non-volatile storage device, and wherein the management system is further capable of instructing the non-volatile storage device to load data into one or more of the memory sections via the switch.

2. The storage system of claim 1, wherein the management system is further capable of instructing the storage system to store a back-up of data stored by one or more of the memory sections into the non-volatile storage device.

3. The storage system of claim 2, wherein in the event the management system receives a fault message from a memory section, the management system instructs the non-volatile storage device to load the back-up of the faulty memory section's data into a functioning memory section, and wherein the switch directs data requests regarding the faulty memory section's data to the functioning memory section.

4. A storage system, comprising:
one or more memory sections, including
one or more memory devices having storage locations for storing data, and
a memory section controller capable of detecting faults in the memory section and transmitting a fault message in response to the detected faults; and one or more switches, including
one or more interfaces for connecting to one or more external devices; and
a switch fabric connected to one or more memory sections and the external device interfaces and interconnecting the memory sections and the external device interfaces based on an algorithm;
a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm; and
an interface for connecting to an external management system such that configuration management may be performed through the external management system.

5. A storage system, comprising:
one or more memory sections, including
one or more memory devices having storage locations for storing data, and
a memory section controller capable of detecting faults in the memory section and transmitting a fault message in response to the detected faults; and
one or more switches, including
one or more interfaces for connecting to one or more external devices; and
a switch fabric connected to one or more memory sections and the external device interfaces and interconnecting the memory sections and the external device interfaces based on an algorithm;
a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm; and
one or more pipeline shift registers, including
one or more shift registers for receiving data stored in a memory device and outputting the data in response to receiving one or more clock signals.

6. A storage system, comprising:
one or more memory sections, including
one or more memory devices having storage locations for storing data, and
a memory section controller capable of detecting faults in the memory section and transmitting a fault message in response to the detected faults; and one or more switches, including
one or more interfaces for connecting to one or more external devices; and
a switch fabric connected to one or more memory sections and the external device interfaces and interconnecting the memory sections and the external device interfaces based on an algorithm; and a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm, wherein one or more memory sections includes a memory interface device for receiving, in response to the memory section receiving a data request, data from a memory device, and the memory interface device combines the requested data and an identifier for use in forwarding the requested data, the address being received by the memory interface device from the memory section controller.

7. The storage system of claim 6, wherein the identifier for use in forwarding the requested data is an address for a device to which the data are to be forwarded.

8. The storage system of claim 6, wherein the identifier for use in forwarding the requested data is an identifier for identifying the data that are to be forwarded.

9. The storage system of claim 6, wherein the data request received by the memory section is forwarded to the memory section controller which determines one or more addresses identifying storage locations in the memory devices responsive to the request and provides the addresses to the memory devices; and wherein the memory devices provide the data in the storage locations identified by the addresses to the memory interface device.

10. The storage system of claim 6, wherein the memory devices include outputs, and wherein at least one of the memory interface devices includes:

at least one set of shift registers interconnected in series, wherein at least one of the shift registers receives a clock signal having a shift frequency, and wherein the shift register is capable of shifting data loaded into the shift register to a next one of the shift registers in the set according to shift frequency; and wherein data from one or more of the outputs of a memory device is loaded into a corresponding shift register in the sets of shift registers and the loaded data is shifted from the shift register to a next one of the shift registers in the set according to the clock signal, such that the shift register maintains its shift frequency during any loading of the data.

11. The storage system of claim 6, wherein the memory devices include outputs, and wherein at least one of the memory interface devices includes:

at least one set of shift registers interconnected in series, wherein at least one of the shift registers receives a clock signal having a shift frequency, and wherein the shift register is capable of shifting data loaded into the shift register to a next one of the shift registers in the set according to the shift frequency; and wherein data in the set of shifted registers is loaded according to the clock signal from one or more shift registers in the set into one or more of the memory devices via an input corresponding to the shift register, such that the shift register maintains its shift frequency during any loading of the data.

12. A storage system, comprising:
one or more memory sections, including
one or more memory devices having storage locations for storing data, and
a memory section controller capable of detecting faults in the memory section and transmitting a fault message in response to the detected faults; and
one or more switches, including
one or more interfaces for connecting to one or more external devices; and
a switch fabric connected to one or more memory sections and the external device interfaces and interconnecting the memory sections and the external device interfaces based on an algorithm; and
a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm,
wherein the management system includes:
one or more control processors for determining and providing the algorithm to the switch; and
one or more administration processors for collecting statistical data from the one or more switches and the one or more memory sections.

13. A storage system, comprising:
one or more memory sections, including
one or more memory devices having storage locations for storing data, and
a memory section controller capable of detecting faults in the memory section and transmitting a fault message in response to the detected faults; and
one or more switches, including
one or more interfaces for connecting to one or more external devices; and
a switch fabric connected to one or more memory sections and the external device interfaces and interconnecting the memory sections and the external device interfaces based on an algorithm; and
a management system capable of receiving fault messages from the memory section controllers and removing from service the memory section from which the fault message was received, and wherein the management system is further capable of determining an algorithm for use by a switch fabric in interconnecting the memory sections and the external device interfaces, and instructing the switch to execute the determined algorithm,
wherein at least one memory section further includes
a temporary storage device for storing data to be written to a memory device; and
a temporary storage interface device for storing data in and retrieving data from the temporary storage device;
wherein at least one of the switches is capable of, in response to receiving data to be stored in the memory section, forwarding the data to the temporary storage interface device, and wherein the temporary storage interface stores the data in the temporary storage device if a memory device to which the data is to be written is busy, and wherein the temporary storage interface device retrieves the data from the temporary storage device when the memory device is no longer busy and forwards the data to the memory device such that the memory device stores the data.

14. A method for use in a storage system, comprising:
storing data in storage locations in a memory device, the memory device included in a memory section;
a management system determining an algorithm for use by a switch in connecting the memory section and an external device interface;
the management system instructing the switch to execute the determined algorithm;
the switch connecting the memory section to the external device interfaces based on the algorithm;
detecting by a memory section controller a fault in regard to the data stored in the memory device and transmitting a fault message in response to the detected fault to the management system;
receiving the fault message at the management system;
the management system removing from service the memory section from which the fault message was received;
the management system instructing a non-volatile storage device to load data into a memory section via the switch; and
storing the data from the non-volatile storage device in a memory device in the memory section.

15. The method of claim 14, further comprising:
storing a back-up of data stored by the memory device into the non-volatile storage device.

16. The method of claim 15, further comprising:
the management system instructing the non-volatile storage device to load the back-up of the faulty memory device's data into a functioning memory device; and
the switch directing a data request regarding the faulty memory device's data to the functioning memory device.

17. A method for use in a storage system, comprising:
storing data in storage locations in a memory device, the memory device included in a memory section;
a management system determining an algorithm for use by a switch in connecting the memory section and an external device interface;
the management system instructing the switch to execute the determined algorithm;
the switch connecting the memory section to the external device interfaces based on the algorithm;
detecting by a memory section controller a fault in regard to the data stored in the memory device and transmitting a fault message in response to the detected fault to the management system;
receiving the fault message at the management system;
the management system removing from service the memory section from which the fault message was received;
a memory interface device in the memory section receiving, in response to the memory section receiving a data request, data from a memory device;
the memory interface device receiving from the memory section controller an identifier for use in forwarding the requested data;
the memory interface device combining the requested data and the identifier, and
the memory interface device forwarding the combined data and identifier to a destination device.

18. The method of claim 17, further comprising:
forwarding to the memory section controller a data request;
the memory section controller determining one or more addresses identifying storage locations in the memory device responsive to the request;
the memory section controller providing the addresses to the memory devices, and
the memory device providing the data in the storage locations identified by the addresses to the memory interface device.

19. A method for use in a storage system, comprising:
storing data in storage locations in a memory device, the memory device included in a memory section;
a management system determining an algorithm for use by a switch in connecting the memory section and an external device interface;
the management system instructing the switch to execute the determined algorithm;
the switch connecting the memory section to the external device interfaces based on the algorithm;
detecting by a memory section controller a fault in regard to the data stored in the memory device and transmitting a fault message in response to the detected fault to the management system;
receiving the fault message at the management system;
the management system removing from service the memory section from which the fault message was received;
a memory interface device in the memory section receiving, in response to the memory section receiving a data request, data from the memory device;
shifting data in one or more shift registers in a set of shift registers interconnected in series from the shift register to a next one of the shift registers in the set on the basis of a clock signal having a shift frequency, wherein the shift registers are included in the memory interface device;
loading data from the memory device into a corresponding shift register in the set; and
shifting the data loaded into one or more of the shift registers to a next one of the shift registers in the set according to the shift frequency, wherein the shift registers maintains their shift frequency during the loading of the data from the memory devices into the shift registers.

20. A method for use in a storage system, comprising:
storing data in storage locations in a memory device, the memory device included in a memory section;
a management system determining an algorithm for use by a switch in connecting the memory section and an external device interface;
the management system instructing the switch to execute the determined algorithm;
the switch connecting the memory section to the external device interfaces based on the algorithm;
detecting by a memory section controller a fault in regard to the data stored in the memory device and transmitting a fault message in response to the detected fault to the management system;
receiving the fault message at the management system;
the management system removing from service the memory section from which the fault message was received;
a memory interface device in the memory section receiving, in response to the memory section receiving a data request, data from the memory device;

shifting data in one or more shift registers in a set of shift registers interconnected in series from the shift registers to a next one of the shift registers in the set on the basis of a clock signal having a shift frequency, the shift registers included in the memory interface device;

loading data from one or more of the shift registers to the memory device; and shifting the data loaded from the one or more shift registers to a next one of the shift registers in the set according to the shift frequency after the data is loaded into the memory device, wherein the shift registers maintains their shift frequency during the loading of the data.

21. A method for use in a storage system, comprising:

storing data in storage locations in a memory device, the memory device included in a memory section;

a management system determining an algorithm for use by a switch in connecting the memory section and an external device interface;

the management system instructing the switch to execute the determined algorithm;

the switch connecting the memory section to the external device interfaces based on the algorithm;

detecting by a memory section controller a fault in regard to the data stored in the memory device and transmitting a fault message in response to the detected fault to the management system;

receiving the fault message at the management system;

the management system removing from service the memory section from which the fault message was received;

receiving data to be stored in the memory device;

forwarding the data to a temporary storage interface device;

the temporary storage device storing data to be stored in a temporary storage device if the memory device to which the data is to be written is busy;

the temporary storage interface device retrieving the data from the temporary storage device when the memory device to which the data is to be stored is no longer busy; and the memory device storing the data.

* * * * *